United States Patent
Welch, Jr. et al.

(10) Patent No.: US 8,911,633 B2
(45) Date of Patent: *Dec. 16, 2014

(54) FLUID TREATMENT ELEMENTS AND FLUID TREATMENT ARRANGEMENTS WITH POSTS AND/OR BANDS BETWEEN FLUID TREATMENT ELEMENTS AND METHODS FOR MAKING AND USING THEM

(75) Inventors: Thomas Welch, Jr., Homer, NY (US); Tanweer ul Haq, Tully, NY (US); Joseph Verschneider, Cortland, NY (US)

(73) Assignee: Pall Corporation, Port Washington, NY (US)

( * ) Notice: Subject to any disclaimer, the term of this patent is extended or adjusted under 35 U.S.C. 154(b) by 1004 days.

This patent is subject to a terminal disclaimer.

(21) Appl. No.: 12/531,711

(22) PCT Filed: Mar. 14, 2008

(86) PCT No.: PCT/US2008/056991
§ 371 (c)(1),
(2), (4) Date: Apr. 14, 2010

(87) PCT Pub. No.: WO2008/115788
PCT Pub. Date: Sep. 25, 2008

(65) Prior Publication Data
US 2010/0187189 A1    Jul. 29, 2010

Related U.S. Application Data

(60) Provisional application No. 60/907,078, filed on Mar. 19, 2007.

(51) Int. Cl.
*B01D 29/21* (2006.01)
*B01D 29/23* (2006.01)
(Continued)

(52) U.S. Cl.
CPC ............ *B01D 63/12* (2013.01); *B01D 53/0446* (2013.01); *B01J 19/2475* (2013.01); *B01D 63/106* (2013.01); *B01J 19/2495* (2013.01); *C02F 3/08* (2013.01); *B01D 25/26* (2013.01); *B01D 53/0415* (2013.01)
USPC ...... 210/767; 210/497.01; 210/446; 210/487; 156/187

(58) Field of Classification Search
USPC ......... 210/330, 331, 346, 347, 486, 487, 488, 210/437, 438, 494.1, 494.2, 494.3, 767; 29/896.62; 55/482, 483, 520
See application file for complete search history.

(56) References Cited

U.S. PATENT DOCUMENTS 1,792,797 A    2/1931    Armstrong
1,820,533 A    8/1931    Foley
(Continued)

FOREIGN PATENT DOCUMENTS

DE    144 207 A1    10/1980
EP    0 291 883 A2    11/1988
(Continued)

*Primary Examiner* — Ling Choi
*Assistant Examiner* — Catherine S Branch
(74) *Attorney, Agent, or Firm* — Leydig, Voit & Mayer

(57) ABSTRACT

Fluid treatment arrangements and elements and methods for making and using fluid treatment arrangements are disclosed. A ribbon including a permeable fluid treatment medium may be spirally wound in a plurality of windings to form a fluid treatment element having a disk-shaped body. Two or more fluid treatment elements may be positioned along a core assembly with spaces between at least some of the adjacent fluid treatment elements. Posts may be located in some of the spaces and may be bonded to the adjacent fluid treatment elements. Bands may encircle some of the spaces to block radial fluid flow into or out of the spaces.

20 Claims, 7 Drawing Sheets

(51) Int. Cl.

| | | |
|---|---|---|
| *B01D 29/07* | (2006.01) | |
| *B01D 37/00* | (2006.01) | |
| *B01D 29/58* | (2006.01) | |
| *B01D 29/41* | (2006.01) | |
| *B29C 63/14* | (2006.01) | |
| *B01D 53/04* | (2006.01) | |
| *B01D 63/12* | (2006.01) | |
| *B01J 19/24* | (2006.01) | |
| *B01D 63/10* | (2006.01) | |
| *B01D 25/26* | (2006.01) | |
| *C02F 3/08* | (2006.01) | |

(56) References Cited

U.S. PATENT DOCUMENTS

| | | | |
|---|---|---|---|
| 1,824,079 A | 9/1931 | Foley | |
| RE19,359 E * | 11/1934 | Armstrong | 210/494.1 |
| 2,339,703 A | 1/1944 | Kamrath | |
| 2,537,897 A | 1/1951 | Hunter | |
| 2,561,685 A | 7/1951 | Boggs | |
| 2,631,732 A | 3/1953 | Vocelka | |
| 2,646,887 A | 7/1953 | Robinson et al. | |
| 2,816,665 A | 12/1957 | Layte et al. | |
| 3,061,107 A | 10/1962 | Taylor | |
| 3,165,471 A | 1/1965 | Hencken | |
| 3,347,391 A | 10/1967 | Steensen | |
| 3,592,769 A | 7/1971 | Decker | |
| 4,695,300 A | 9/1987 | Takagi | |
| 4,792,397 A | 12/1988 | Rasmussen | |
| 5,707,517 A * | 1/1998 | Rolchigo et al. | 210/232 |
| 6,113,784 A | 9/2000 | Stoyell et al. | |
| 6,669,844 B2 | 12/2003 | Strohm et al. | |
| 6,827,851 B1 | 12/2004 | Strohm et al. | |
| 7,351,345 B2 | 4/2008 | Diemer et al. | |
| 7,357,866 B2 | 4/2008 | Diemer et al. | |
| 2002/0046971 A1 | 4/2002 | Strohm et al. | |
| 2003/0089090 A1* | 5/2003 | Sundet et al. | 55/499 |
| 2004/0035783 A1 | 2/2004 | Strohm et al. | |
| 2004/0079694 A1 | 4/2004 | Diemer et al. | |
| 2004/0094467 A1* | 5/2004 | Diemer et al. | 210/347 |
| 2005/0155923 A1 | 7/2005 | Diemer et al. | |
| 2008/0169234 A1 | 7/2008 | Diemer et al. | |
| 2008/0230470 A1 | 9/2008 | Diemer et al. | |

FOREIGN PATENT DOCUMENTS

| | | |
|---|---|---|
| EP | 0 666 094 A2 | 8/1995 |
| FR | 873 926 A | 7/1942 |
| GB | 9228 | 0/1911 |
| JP | 60-238112 A | 11/1985 |
| JP | 62-123215 U | 8/1987 |
| WO | WO 01/21279 A1 | 3/2001 |
| WO | WO 03/041829 A2 | 5/2003 |
| WO | WO 2007/017110 A1 | 2/2007 |
| WO | WO 2007/017111 A1 | 2/2007 |

* cited by examiner

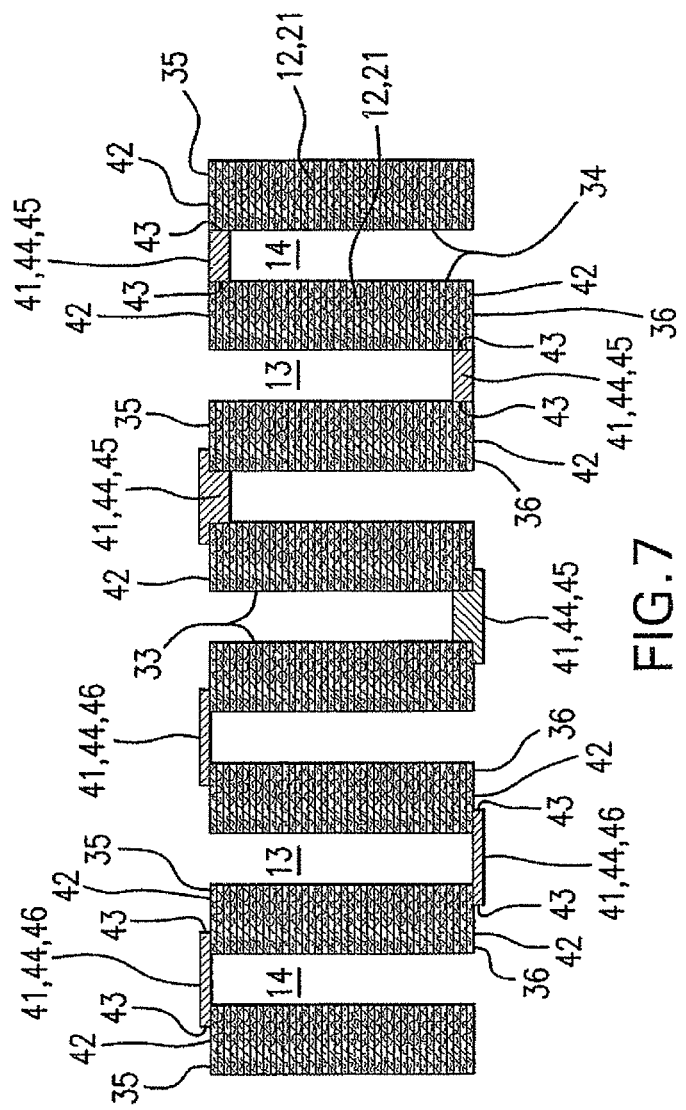

FLUID TREATMENT ELEMENTS AND FLUID TREATMENT ARRANGEMENTS WITH POSTS AND/OR BANDS BETWEEN FLUID TREATMENT ELEMENTS AND METHODS FOR MAKING AND USING THEM

This application claims priority based on U.S. Provisional Application No. 60/907,078, which was filed on Mar. 19, 2007, and is incorporated by reference.

DISCLOSURE OF THE INVENTION

The present invention relates to fluid treatment elements and arrangements and methods for making and using them. In particular, the present invention relates to fluid treatment arrangements and methods for making and using fluid treatment arrangements which include one or more spirally wound fluid treatment elements. A fluid treatment element may be fashioned by spirally winding a ribbon in a plurality of windings to form a generally disk-shaped body. The ribbon may include a long, narrow strip of a permeable fluid treatment medium having first and second opposite major surfaces and first and second opposite side edges. The disk-shaped body may have an end surface which faces in one direction, another end surface which faces in the opposite direction, and an outer rim. To form a fluid treatment arrangement, several of these fluid treatment elements may be positioned along a hollow core assembly with a space between at least some of the elements.

A fluid may be directed through a fluid treatment element, i.e., from one end surface to the opposite end surface of the fluid treatment element. The fluid may enter one end surface of the fluid treatment element from one space adjacent to the end surface. As the fluid passes through the fluid treatment element, the fluid may generally pass edgewise through the permeable fluid treatment medium of each winding, i.e., the fluid may flow generally laterally within the permeable medium generally parallel to the first and second opposite major surfaces. For example, the fluid may enter the permeable medium through one side edge of the ribbon, flow laterally within the permeable medium to the opposite edge of the ribbon, and exit the permeable medium through the opposite side edge. As the fluid passes through the fluid treatment element, the fluid may also flow from the permeable fluid treatment medium of one winding radially into and then laterally along the permeable medium of one or more adjacent or nearby windings. The fluid may exit the fluid treatment element from the opposite end surface to another space adjacent to the opposite end surface.

Fluid treatment arrangements embodying one or more aspects of the invention may be used to treat fluids, including gases, liquids, or mixtures of gases, liquids, and/or solids, in a wide variety of ways. For many embodiments, the fluid treatment arrangement may be used in a separation process to separate one or more substances from the fluid. For example, the separation process may be a filtration process where a fluid is directed through the fluid treatment elements of the fluid treatment arrangement and substances in the fluid, e.g., particulates or molecules above a certain size, are prevented by the fluid treatment media from passing through the elements with the fluid. As another example, the separation process may be a capture process where a fluid is directed through the fluid treatment elements and substances in the fluid, e.g., ions, molecules, proteins, nucleic acids, or other chemical substances, are chemically or physically bound to the fluid treatment media. For other embodiments, the fluid treatment arrangement may be used in a coalescing process where a fluid is directed through the fluid treatment elements and small droplets of liquid entrained in the fluid are aggregated and enlarged as the fluid passes through the fluid treatment media, allowing larger liquid droplets to emerge from the element and to be more easily removed from the fluid.

SUMMARY OF THE INVENTION

In accordance with one aspect of the invention, fluid treatment arrangements may comprise a hollow core assembly, first and second adjacent fluid treatment elements, a plurality of posts, and a fluid pathway. The hollow core assembly may have an interior and an axis. The first and second adjacent fluid treatment elements may be mounted along the core assembly axially separated from one another and defining a space between them. Each fluid treatment element may include a ribbon which has a permeable fluid treatment medium. The ribbon may be spirally wound in a plurality of windings to define a generally disk-shaped body. The disk-shaped body may have a radial dimension, a first end surface on one side of the body, a second end surface on the opposite side of the body, and an outer rim. The plurality of posts may be positioned in the space between the first and second fluid treatment elements. Each post may extend along windings of at least one of the first and second fluid treatment elements. The fluid pathway may extend between the first and second end surfaces of each fluid treatment element generally edgewise through the permeable fluid treatment medium to or from the space past the posts.

In accordance with another aspect of the invention, fluid treatment arrangements may comprise a hollow core assembly, a plurality of disk-shaped fluid treatment elements, a surround, and a plurality of posts. The hollow core assembly may have an interior and an axis. Each fluid treatment element may include a ribbon which has at least one strip of a permeable fluid treatment medium having first and second opposite side edges. The ribbon may be spirally wound in a plurality of windings and may define a first axially-facing end surface, a second axially facing end surface, and an outer rim. The first end surface may comprise a plurality of windings of the first side edge of the permeable fluid treatment medium strip, and the second end face may comprise a plurality of windings of the second side edge of the permeable fluid treatment medium strip. The plurality of fluid treatment elements may be positioned along the core assembly with at least some adjacent fluid treatment elements axially separated from one another and defining a plurality of first spaces and a plurality of second spaces. Each first space may extend between the first end surfaces of adjacent fluid treatment elements, and each second space may extend between the second end surfaces of adjacent fluid treatment elements. The surround may be positioned around each first space at the outer rims of the adjacent fluid treatment elements to fluidly isolate an outer end of each first space. The plurality of posts may be positioned in at least one of a first space and a second space. Each post may extend along windings of at least one of the adjacent fluid treatment elements.

In accordance with another aspect of the invention, methods for making a fluid treatment arrangement may comprise positioning first and second spirally wound, disk-shaped fluid treatment elements along a hollow core assembly axially separated from one another to define a space between the end surfaces of the first and second fluid treatment elements. The methods may also comprise positioning a plurality of posts along a plurality of windings of at least one end surface of at least one of the first and second fluid treatment elements.

In accordance with another aspect of the invention, fluid treatment elements may comprise a ribbon which includes a permeable fluid treatment medium. The ribbon may be spirally wound in a plurality of windings to form a disk-shaped body having a first axially facing end surface on one side of the body, a second axially-facing end surface on the opposite side of the body, and an outer rim. The fluid treatment elements may further comprise a plurality of posts and a fluid pathway. The plurality of posts include posts which may extend along and may be bonded to windings of at least one end surface of the disk-shaped body. The fluid pathway may extend through the permeable fluid treatment medium and past the posts.

In accordance with another aspect of the invention, methods for making a fluid treatment element may comprise spirally winding a permeable fluid treatment medium in a plurality of windings and forming a generally disk-shaped body having opposite end surfaces and an outer rim. The methods may further comprise bonding a plurality of posts to windings of at least one of the end surfaces of the disk-shaped body.

In accordance with another aspect of the invention, methods for treating a fluid may comprise directing a fluid between the exterior of a fluid treatment arrangement and the interior of a core assembly. Directing the fluid includes passing the fluid generally edgewise through windings of a spirally wound strip of a permeable fluid treatment medium, treating the fluid by the permeable fluid treatment medium, and passing the fluid through a space adjacent to the spirally wound strip past posts that are bonded to the windings.

Embodiments of one or more of these aspects of the invention have many advantages. For example, by providing posts in a space between adjacent fluid treatment elements, there is much less resistance to fluid flow through the space, which significantly improves the performance of the fluid treatment arrangements. Further, the posts function as small but effective spacers and/or supports which prevent adjacent fluid treatment elements from collapsing into a space, thereby enhancing the structural integrity of the fluid treatment elements and arrangements. In addition, by providing posts along some or all of the windings of a spirally wound fluid treatment element, the windings are more securely held in place against one another. The fluid treatment elements and arrangements are thus more reliable and effective because fluid may not bypass the fluid treatment media by flowing between separated windings.

In accordance with another aspect of the invention, fluid treatment arrangements may comprise a hollow core assembly, first and second adjacent fluid treatment elements, a band, and a fluid pathway. The hollow core assembly may have an interior and an axis. The first and second fluid treatment elements may be mounted along the core assembly axially separated from one another and defining a space between them. Each fluid treatment element may include a ribbon which has a permeable fluid treatment medium. The ribbon may be spirally wound in a plurality of windings to define a generally disk-shaped body. The disk-shaped body may have a radial dimension, a first end surface on one side of the body, a second end surface on the other side of the body, and a rim. The space may have an end between the rims of the first and second fluid treatment elements. The band may encircle and seal the end of the space and may extend along the rims of the first and second fluid treatment elements. At least a portion of the rim of at least one of the first and second fluid treatment elements may be exposed beyond an edge of the band. The fluid pathway may extend between the first and second end surfaces of each fluid treatment element generally edgewise through the permeable fluid treatment medium to or from the space.

In accordance with another aspect of the invention, fluid treatment arrangements may comprise a hollow core assembly, a plurality of disk-shaped fluid treatment elements, and a surround. The hollow core assembly has an interior and an axis. Each fluid treatment element may include a ribbon which has at least one strip of a permeable fluid treatment medium having first and second opposite side edges. The ribbon may be spirally wound in a plurality of windings and may define a first axially-facing end surface, a second axially facing end surface, and an outer rim. The first axially facing end surface may comprise a plurality of windings of the first side edge of the permeable fluid treatment medium, and the second axially facing end surface may comprise a plurality of windings of the second side edge of the permeable fluid treatment element. The plurality of fluid treatment elements may be positioned along the core assembly with at least some adjacent fluid treatment elements axially separated from one another and defining a plurality of first spaces and a plurality of second spaces. Each first space may extend between the first end surfaces of adjacent fluid treatment elements, and each second space may extend between the second end surfaces of adjacent fluid treatment elements. The surround may be positioned around each first space at the outer rims of the adjacent fluid treatment elements to fluidly isolate an outer end of each first space. The surround may comprise a plurality of bands. Each band may encircle and seal the outer end of a first space and extend along the outer rims of the adjacent fluid treatment elements. At least a portion of the outer rims of the adjacent fluid treatment elements may be exposed beyond an edge of the band.

In accordance with another aspect of the invention, methods for making a fluid treatment arrangement may comprise positioning first and second spirally wound, disk-shaped fluid treatment elements along a hollow core assembly axially separated from one another to define a space between end surfaces of the first and second fluid treatment elements. The methods may further comprise positioning a band around an end of the space and along the rims of the first and second fluid treatment elements to seal the space and exposing a portion of the rim of at least one of the first and second fluid treatment elements beyond an edge of the band.

Embodiments of one or more of these aspects of the invention also have many advantages. For example, by providing a band around an end, e.g., the outer end, of the space and along the outer rims of the adjacent fluid treatment elements, the space is reliably sealed from the exterior of the fluid treatment elements. Further, because a portion of the rim of at least one of the adjacent fluid treatment elements is exposed beyond an edge of the band, the surface area of the fluid treatment element into which, or from which, fluid may flow is significantly increased. For example, fluid may flow into the fluid treatment element not only through an axially-facing end surface but also through the exposed portion of the rim. The resulting increase in surface area of the fluid treatment element can significantly enhance the performance of the fluid treatment arrangement, including the dirt capacity and/or the service life of the fluid treatment elements.

In accordance with another aspect of the invention, fluid treatment arrangements may comprise a hollow core assembly, first and second fluid treatment elements, a band of solidified settable bonding material, and a fluid pathway. The hollow core assembly may have an interior and an axis. Each fluid treatment element may include a ribbon which has a permeable treatment medium. The ribbon may be spirally wound in a plurality of windings to define a generally disk-shaped body having a radial dimension, a first end surface on one side of the body, a second end surface on the opposite side of the body, and a rim. The first and second fluid treatment elements may be mounted along the core assembly axially separated from one another and defining a space between them. The space may have an end between the rims of the first and second fluid treatment elements. The band of solidified settable bonding material may encircle and seal the end of the space and may be bonded to the first and second fluid treatment elements. The fluid pathway may extend between the first and second end surfaces of each fluid treatment element generally edgewise through the permeable fluid treatment medium to or from the space.

In accordance with another aspect of the invention, a fluid treatment arrangement may comprise a hollow core assembly, a plurality of disk-shaped fluid treatment elements, and a surround. The hollow core assembly may have an interior and an axis. Each fluid treatment element may include a ribbon which has at least one strip of a permeable fluid treatment medium having first and second opposite side edges. The ribbon may be spirally wound in a plurality of windings to define a first axially-facing end surface, a second axially-facing end surface, and an outer rim. The first axially-facing end surface may comprise a plurality of windings of the first side edge of the permeable fluid treatment medium strip. The second axially-facing end surface may comprise a plurality of windings of the second side edge of the permeable fluid treatment medium strip. The plurality of fluid treatment elements may be positioned along the core assembly with at least some adjacent fluid treatment elements axially separated from one another and defining a plurality of first spaces and a plurality of second spaces. Each first space may extend between the first end surfaces of adjacent fluid treatment elements, and each second space may extend between the second end surfaces of adjacent fluid treatment elements. The surround may be positioned around an outer end of each first space to fluidly isolate the first spaces. The surround may include a plurality of bands. Each band may comprise a solidified settable bond material which encircles and seals the outer end of the first space and is bonded to the adjacent fluid treatment elements.

In accordance with another aspect of the invention, methods for making a fluid treatment arrangement may comprise positioning first and second spirally wound, disk-shaped fluid treatment elements along a hollow core assembly axially separated from one another to define a space between them. The methods may further comprise applying a liquid settable bonding material around an end of the space and in contact with the first and second fluid treatment elements and solidifying the settable bonding material to seal the space.

Embodiments of one or more of these aspects of the invention also have many advantages. By providing a settable bonding material around the end of one or more of the spaces, each space may be quickly and reliably sealed, speeding manufacture. Further, for some embodiments the solidified settable bonding material may be bonded mainly to the end surfaces of the adjacent fluid treatment elements at the outer end of the space, leaving most of the outer rims of the adjacent fluid treatment elements exposed. The exposed outer rims significantly increase the surface area of each fluid treatment element into which, or from which, fluid may flow and greatly enhances the performance of the fluid treatment arrangement including the dirt capacity and/or service life of the fluid treatment elements.

BRIEF DESCRIPTION OF THE DRAWINGS

FIG. 7 is a quarter sectioned view of fluid treatment elements and various surrounds.

DESCRIPTION OF EMBODIMENTS

Figure 1:
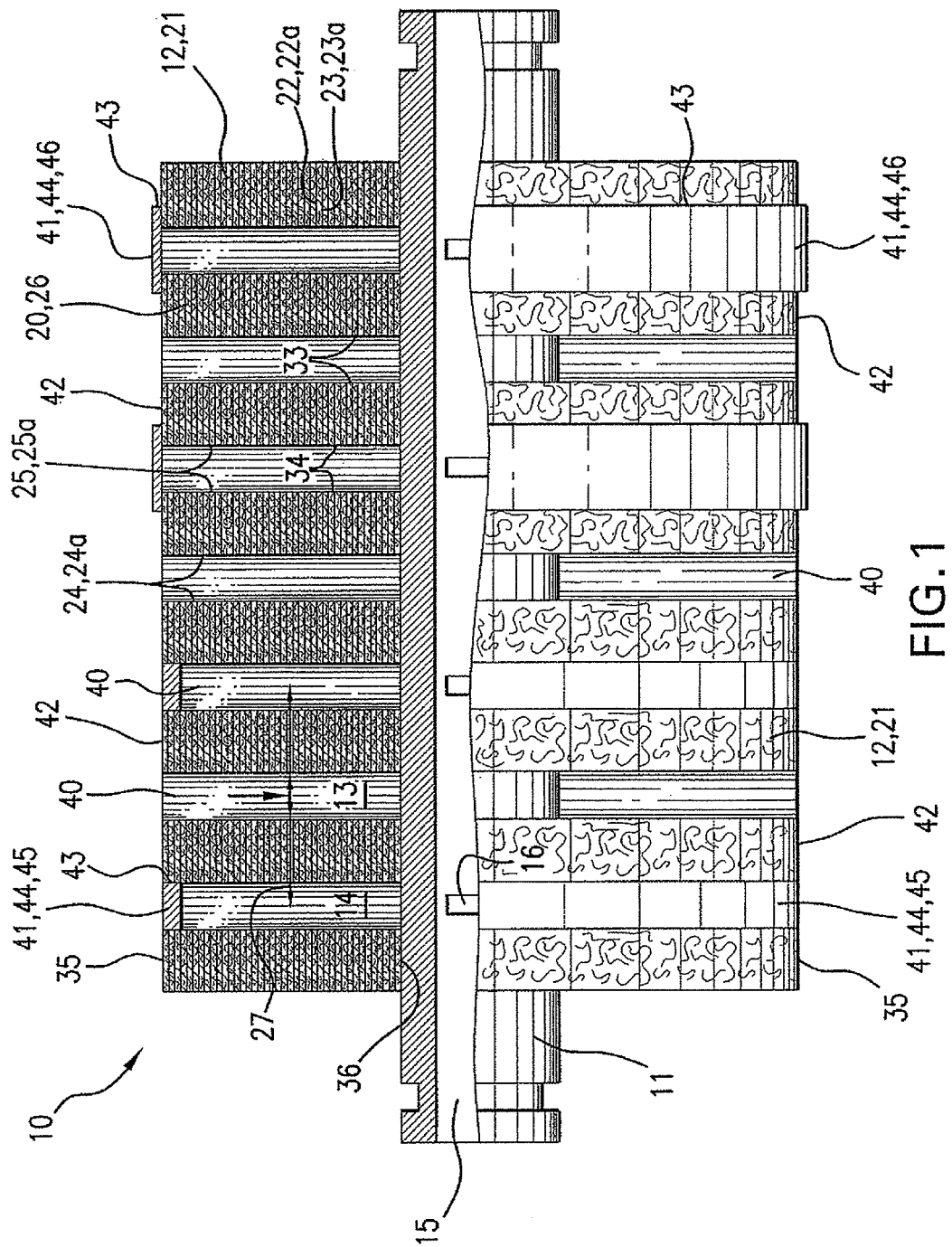
FIG. 1 is a quarter sectioned view of a fluid treatment arrangement.
Figure 2:
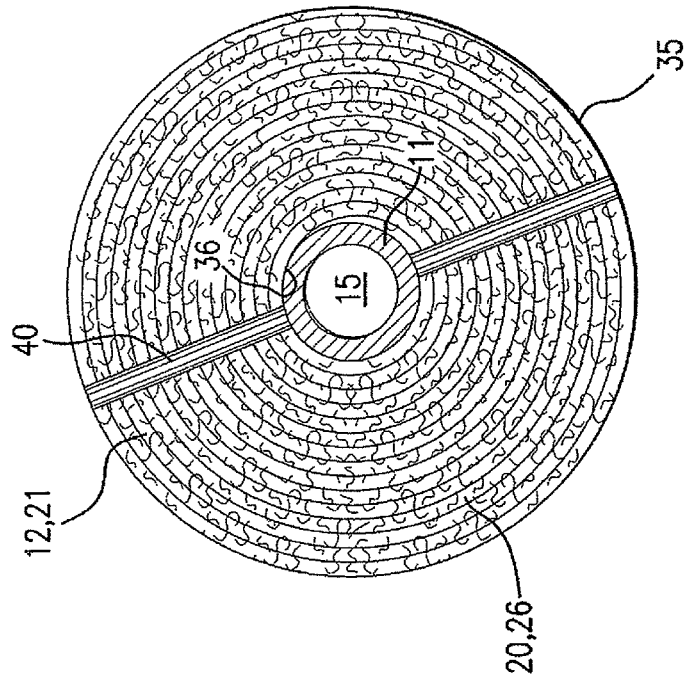
FIG. 2 is a front view of a fluid treatment element of FIG. 1.

Fluid treatment arrangements embodying one or more aspects of the invention may be configured in a wide variety of ways. One example of a fluid treatment arrangement is shown in FIGS. 1 and 2, but fluid treatment arrangements are not limited to the features illustrated in either of these figures. As shown in FIGS. 1 and 2, a fluid treatment arrangement 10 may comprise a core assembly 11 and a plurality of spirally wound fluid treatment elements 12 positioned along the core assembly 11, e.g., circumjacent to and contacting the core assembly 11. The widths and/or radial dimensions of the fluid treatment elements 12 may be similar, e.g., substantially equal, or they may vary along the core assembly 11. All of the fluid treatment elements 12 may be axially separated from one another to define spaces 13, 14 between adjacent fluid treatment elements 12. Alternatively, some of the fluid treatment elements may be axially positioned along the core assembly side-by-side in close proximity, e.g., contacting one another, while others of the fluid treatment elements may be axially separated from adjacent fluid treatment elements to define spaces between them. The core assembly 11 may comprise a core, such as a pipe or a tube, having an axis and a generally hollow configuration, including an interior 15. The core assembly 11 may have two open ends or an open end and a closed or blind end. The core assembly 11 may also have openings 16, e.g., axially separated openings, such as slots or other perforations, which allow some of the spaces 14 to fluidly communicate with the interior 15 of the core assembly 11. The spaces 14 that fluidly communicate with the interior 15 of the core assembly 11 may be fluidly isolated from the exterior of the fluid treatment elements 12, e.g., the region radially beyond the fluid treatment elements. Other spaces 13 may be fluidly isolated from the interior 15 of the core assembly 11, for example, by a solid wall portion of the core assembly 11 which has no openings and which extends across and blocks the inner end of the space, and these spaces 13 may fluidly communicate with the exterior of the fluid treatment elements 12. Still other spaces may be isolated from both the interior of the core assembly and the exterior of the fluid treatment elements.

Fluid may be directed generally inwardly or outwardly between the interior 15 of the core assembly 11 and the exterior of the fluid treatment arrangement 10, e.g., the region radially beyond the fluid treatment arrangement. For example, for many embodiments, including the embodiment illustrated in FIG. 1, a feed fluid may be directed along a fluid flow path from the exterior of the fluid treatment arrangement 10 generally radially inwardly into feed spaces 13 which fluidly communicate with the exterior but are isolated from the interior 15 of the core assembly 11. From the feed spaces 13, the fluid may flow generally axially along the fluid flow path through one or more adjacent fluid treatment elements 12. As the fluid flows through the fluid treatment elements 12, the fluid may be treated according to the fluid treatment characteristics of the elements. The fluid may flow generally axially from the fluid treatment elements 12 into permeate spaces 14 which are fluidly isolated from the exterior of the fluid treatment elements 12 but which fluidly communicate with the interior 15 of the core assembly 11 via the openings 16 in the core assembly 11. From the permeate spaces 14, the fluid may flow along the fluid flow path generally radially inwardly into and then axially along the interior 15 of the core assembly 11. Alternatively, the feed fluid may be directed into the interior of the core assembly and generally radially outwardly along a fluid flow path from the interior of the core assembly through the openings in the core assembly into feed spaces which are fluidly isolated from the exterior of the fluid treatment arrangement. From the feed spaces, the fluid may flow generally axially along the fluid flow path through one or more adjacent fluid treatment elements and into permeate spaces which are fluidly isolated from the interior of fluid treatment arrangement but which fluidly communicate with the exterior of the fluid treatment arrangement. From the permeate spaces, the fluid may flow generally radially outwardly along the flow path to the exterior of the fluid treatment arrangement.

Figure 3:
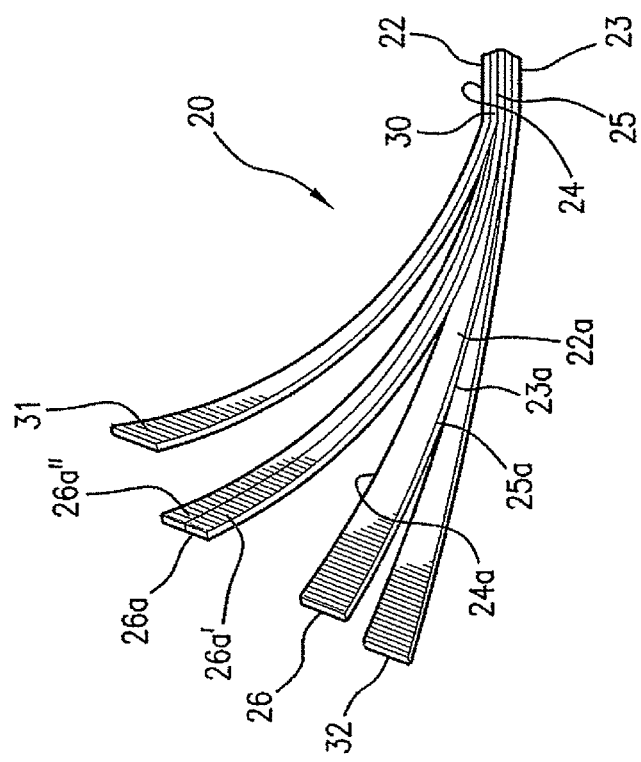
FIG. 3 is an oblique view of a ribbon.

An example of a fluid treatment element 12 is shown in FIG. 2, but fluid treatment elements are not limited to the features illustrated in this figure. As shown in FIG. 2, the fluid treatment element 12 may comprise a ribbon 20 which is spirally wound in a plurality of windings to form a generally disk-shaped body 21. Ribbons may be configured in a wide variety of ways. One example of a ribbon is shown in FIG. 3, but ribbons are not limited to the features illustrated in this figure. As shown in FIG. 3, the ribbon 20 may have a long, narrow configuration with opposite major surfaces 22, 23 and opposite side edges 24, 25. The ribbon 20 includes a strip of a permeable fluid treatment medium 26 which also has opposite major surfaces 22a, 23a and opposite side edges 24a, 25a. The ribbon 20 including the porous fluid treatment medium may be permeable but unperforated, i.e., free of any through holes or through slots which extend between the opposite major surfaces 22, 23; 22a, 23a.

The permeable fluid treatment medium may be formed from any of numerous materials, including, for example, a natural or synthetic polymer, glass, metal, carbon, and/or a ceramic. The permeable fluid treatment medium may be formed from any of a variety of structures, including, for example, fibrous structures, such as woven or non-woven fibrous strips; meshes, such as woven, extruded, or expanded mesh strips; permeable membranes, such as supported or unsupported membrane strips; porous foam strips; or porous metals, such as porous sintered fiber metal or powder metal strips.

The permeable fluid treatment medium may have any of a myriad of treatment characteristics. For example, the permeable fluid treatment medium may have, or may be modified to have, any of several characteristics. The permeable fluid treatment medium may have a positive, negative, or neutral electrical charge; it may be liquiphobic or liquiphilic including, for example, hydrophobic or hydrophilic, or oleophobic or oleophilic; it may include attached functional groups, such as ligands or any other reactive moiety, that can chemically bind to substances in the fluid. The permeable fluid treatment medium may be formed from, impregnated with, or otherwise contain a variety of materials that function to treat the fluid in any of various ways. These functional materials may include, for example, sorbents, ion exchange resins, chromatography media, enzymes, reactants or catalysts of all types that may chemically or physically bind, react with, catalyze, deliver, or otherwise affect substances in the fluid or the fluid itself. Further, the permeable fluid treatment medium may have any of a wide range of removal ratings, including, for example, from ultraporous or nanoporous or finer to microporous or coarser. For example, the removal rating may be in the sub-micron range or finer, e.g., up to about 0.02 µm or coarser or up to about 0.1 µm or coarser, or in the micron range or coarser, e.g., up to about 1 µm or coarser, or about 5 µm or coarser, or about 10 µm or coarser, or about 50 µm or coarser, or about 75 µm or coarser, or about 100 µm or coarser, or about 200 µm or coarser, or about 300 µm or coarser, or about 500 µm or coarser, or about 1000 µm or coarser. For many embodiments, at least one of the permeable fluid treatment media may comprise a filter medium of non-woven polymeric or glass fibers, and the fluid treatment characteristic of the permeable fluid treatment medium may comprise a removal rating of about 0.02 µm or coarser.

The ribbon, including the strip of permeable fluid treatment medium may have a variety of lengths, thicknesses, and widths. For many embodiments, the ribbon may be continuous and extend the full length required to provide a sufficient number of windings to form a fluid treatment element having any desired radial dimension. For other embodiments, shorter segments of the ribbon may be connected end-to-end to extend the full length. Further, for many embodiments, the ribbon may be generally straight along the length of the strip. However, the ribbon may be curved. For example, the ribbon may have a cyclical, e.g., sinusoidal or sawtooth, pattern which extends along the length of the strip.

The thickness of the ribbon, including the strip of permeable fluid treatment medium, i.e., the distance through the ribbon from one major surface to the opposite major surface, may vary from one ribbon to another, depending, for example, on the structure of the porous fluid treatment medium. The thickness may be in the range from about two thousandths of an inch or less, for example, for a thin permeable polymeric membrane, to about 250 thousandths of an inch or more, for example, for a lofty fibrous material or a porous foam. Although the thickness may be nonuniform along the length of a ribbon, for many embodiments the thickness is uniform along the length of the ribbon.

The width of the ribbon, including the strip of permeable fluid treatment medium, i.e., the distance through the ribbon from one side edge to the opposite side edge, may also vary from one ribbon to another. As fluid flows through the fluid treatment element 12, some, most or all of the fluid may pass edgewise through the ribbon and the strip of permeable fluid treatment medium 26 from one side edge 24, 25 to the opposite side edge 25, 24. Consequently, the width of the ribbon may affect the pressure drop and the degree of treatment that the fluid undergoes. For example, the width of the ribbon may affect the filtration efficiency. For many embodiments, the width may be in the range from about one-sixteenth of an inch or less to about 1 inch or 2 inches or 3 inches or more. For example, the width may be in the range from about 2 inches or less, e.g., 1 inch or less, to about one-sixteenth inch or more, including the range from about one-eighth inch or more to about one-half inch or less. Further, the width may be uniform along the length of the ribbon, providing a more uniform treatment of the fluid as it flows through the fluid treatment element. Alternatively, the width of the ribbon may be nonuniform along the length of the strip. For example, the width of the ribbon may vary along the length over a shorter distance, e.g., providing a ribbon with one or two pinked edges, or over a longer distance, e.g., providing a fluid treatment element which tapers to a narrow rim or flares to a wide rim, for example. Pinked edges, as well as fringed or frizzed edges, are disclosed, for example, in U.S. Provisional Application No. 60/907,065 entitled Fluid Treatment Elements and Fluid Treatment Arrangements with Fluid Treatment Elements Having Uneven Surfaces and Methods for Making and Using Them, which lists Thomas Welch, Jr., Stephen Geibel, and Tanweer ul Haq as an inventor and which was filed on Mar. 19, 2007, and the PCT International Application which claims priority based on this Provisional Application, both of which are incorporated by reference to support these and other features.

The ribbon 20 may include the strip of permeable fluid treatment medium 26 as the sole component of the ribbon, and the major surfaces of the fluid treatment medium may be in contact along adjacent windings. Alternatively, the ribbon may include multiple components. For example, the ribbon may include the permeable fluid treatment medium as one layer of a multilayer composite 30 with two or more layers superposed on one another, as shown in FIG. 3. Various additional layers may be included, such as additional layers of permeable fluid treatment media 26a. The fluid treatment media 26, 26a may be identical to, or different from, one another. For example, the permeable fluid treatment medium layers may have the same fluid treatment characteristics or different fluid treatment characteristics, providing a fluid treatment element with fluid treatment media having different fluid treatment characteristics in parallel with one another. Another additional layer may be a strengthening strip 31 that enhances the structural integrity of the ribbon. The ribbon may be in tension as it is wound in multiple windings to form the fluid treatment element, and the strip of permeable fluid treatment medium may not have sufficient strength to withstand the tension. Consequently, a strengthening strip 31 that can better withstand the tension, such as a strip of a polymeric film, may be layered with the fluid treatment medium. Another additional layer may be a bonding strip 32 for bonding adjacent surfaces of adjacent windings of the ribbon. While the multiple layers of the composite ribbon may not all have of the same width or be in register, for many embodiments, the multiple layers all have substantially the same width and the side edges are in register, as shown in FIG. 3. The ends of the layers may be in register or may be staggered. For many embodiments, the thickness of the additional layers, other than any additional fluid treatment medium layers, may be less than the thickness of the fluid treatment medium layers to increase the relative volume of the fluid treatment medium within the fluid treatment element. To reduce the amount of fluid that may bypass the fluid treatment medium as it flows through the fluid treatment element, the resistance to fluid flow edgewise through the additional layers may be at least substantially equal to or greater than the resistance to fluid flow edgewise through the fluid treatment medium layers. For some embodiments, the permeability edgewise through the additional layers may be substantially equal to or less than the permeability edgewise through the fluid treatment medium layers, and/or the removal rating edgewise through the additional layers may be substantially equal to or finer than the removal rating edgewise through the fluid treatment medium layers. For some embodiments, some or all of the layers of the composite ribbon, other than the permeable fluid treatment medium layers, may be impermeable. Alternatively, the resistance to fluid flow edgewise through the additional layers may be less than the resistance to fluid flow edgewise through the fluid treatment medium layers. For some embodiments, the permeability edgewise through the additional layers may be greater than the permeability edgewise through the fluid treatment medium layers, and/or the removal rating edgewise through the additional layers may be coarser than the removal rating edgewise through the fluid treatment medium layers.

Alternatively or additionally, the ribbon may include multiple components, e.g., two, three, four, five, or more components, that are arranged side-by-side in series in the fluid flow path edgewise through the ribbon. The side-by-side components may have spaces or intervening structures between them or may be arranged in close proximity, e.g., in contact. For example, multiple strips of fluid treatment media may be arranged edge side-by-edge side. The additional layer 26a of porous fluid treatment medium shown in FIG. 3 is but one example of a side-by-side arrangement of multiple strips. One strip 26a' may be positioned coplanar with and in close proximity to an adjacent strip 26a". For example, the side edges of the strips 26a', 26a" may contact one another along the length of the ribbon 20. The media may be similar to or different from another, e.g., may have the same or different fluid treatment characteristics. For some embodiments, two or more of the media may have different pore sizes, e.g., each successive medium may have a larger or smaller removal rating or pore structure, providing a pore size gradient across the width of the ribbon. For example, the downstream strip of fluid treatment medium may have a finer removal rating or pore structure than the upstream strip of fluid treatment medium. For other embodiments, two or more of the media may provide a different kind of fluid treatment, e.g., filtration, sorption, and ion exchange. The strips in the side-by-side arrangement may have similar or different widths, thicknesses, and/or lengths. The side-by-side strips may be supported in a variety of ways. For example, the multiple strips may be superposed with a support layer. The support layer may be thin and impermeable and may have a width which is less than, about equal to, or greater than the combined widths of the fluid treatment media strips.

Figure 4:
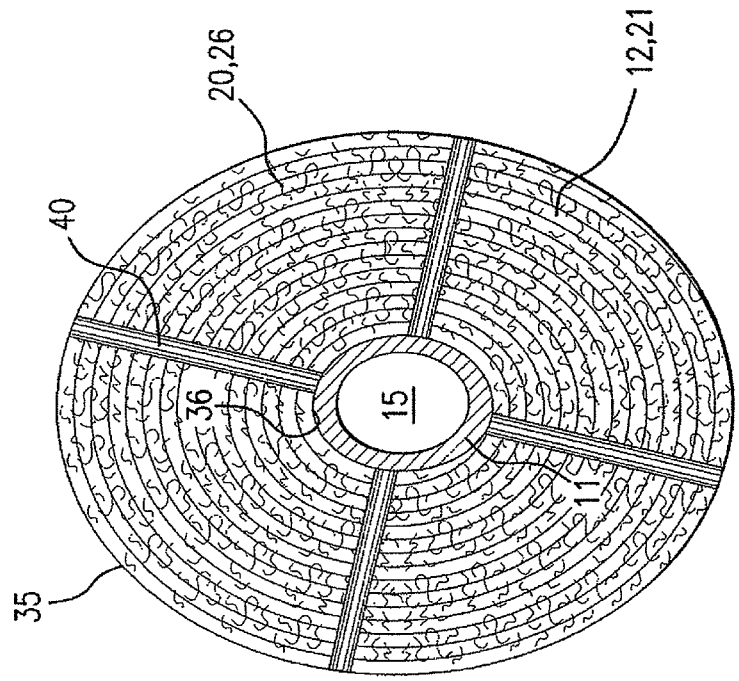
FIG. 4 is a front view of another fluid treatment element.
Figure 6:
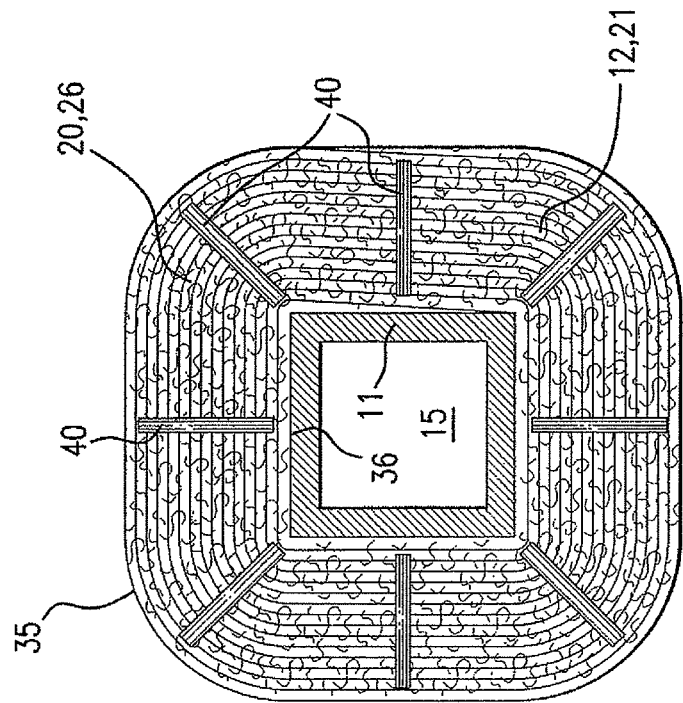
FIG. 6 is a front view of another fluid treatment element.
Figure 5:
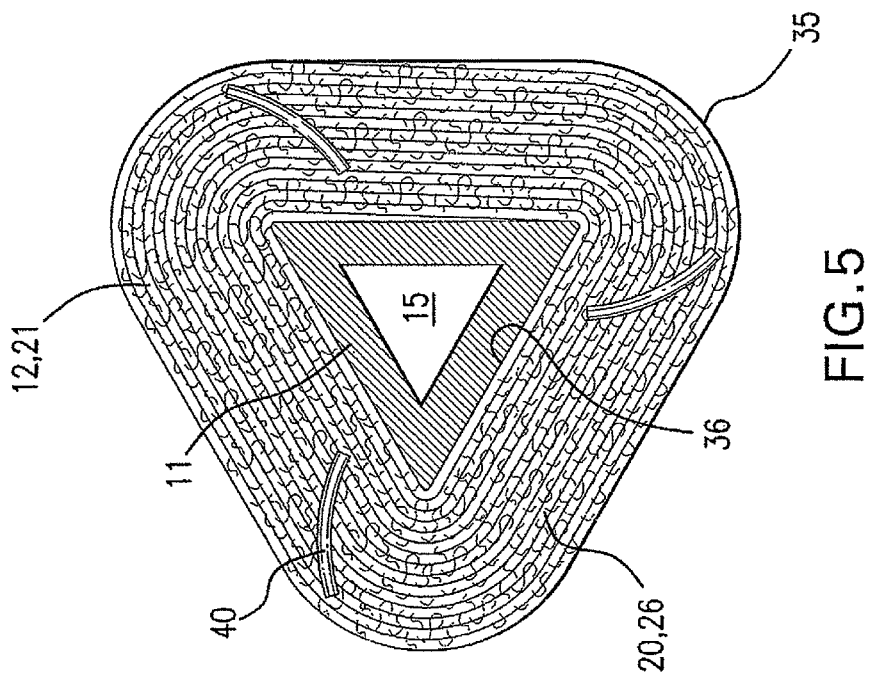
FIG. 5 is a front view of another fluid treatment element.

A fluid treatment element 12 formed by spirally winding the ribbon 20 in a plurality of windings may have any of numerous irregular or regular geometrical forms. For example, the spirally wound disk-shaped body 21, as well as the core assembly 11, of the fluid treatment element 12 may have a generally circular form, as shown in FIG. 2, or a generally oval, triangular, or rectangular form, as shown in FIGS. 4, 5, and 6, respectively. The radial dimension of a fluid treatment element 12, i.e., the dimension generally perpendicular to the axis of the core assembly 11, for example, from the innermost winding to the outermost winding, may vary, depending, for example, on the number of windings and the thickness of the ribbon. For example, the radial dimension may be in the range from about ¼ inch or less or about ⅛ inch or less to up to about 1 inch or up to about 2 inches or up to about 6 inches or up to about 10 inches or up to about 25 inches or more. The volume of a fluid treatment element 12 may vary, for example, in accordance with the width of a ribbon and the radial dimension of the disk-shaped body. For some embodiments, all of the fluid treatment elements of a fluid treatment arrangement may have the same volume. For some embodiments, the fluid treatment elements may have different volumes.

As shown in FIG. 1, each disk-shaped body 21 may have an end surface comprising a feed or inflow surface 33 which faces in one axial direction, an end surface comprising a permeate or outflow surface 34 which faces in the opposite axial direction, an outer rim 35 along the exterior of the fluid treatment element 12, an inner rim 36 along the interior of the fluid treatment element 12, and a radial dimension, e.g., from the initial winding near the core assembly to the outer rim 35. Each feed surface 33 may comprise the plurality of windings of one side edge, e.g., the feed side edge 24, of the ribbon 20, including the feed side edge 24a of the permeable fluid treatment medium strip 26. Each permeate surface 34 may comprise the plurality of windings of the other outer side edge, e.g., the permeate side edge 25, of the ribbon 20, including the permeate side edge 25a of the permeable fluid treatment medium strip 26. A fluid pathway 27 may extend generally edgewise between the side edges 24a, 25a through the porous fluid treatment strip 26 from one end surface to the other end surface of the fluid treatment element 12. Either or both end surfaces may be an even surface or may be an uneven surface, for example, as disclosed in previously referenced U.S. Provisional Application No. 60/907,065 entitled Fluid Treatment Elements and Fluid Treatment Arrangements with Fluid Treatment Elements Having Uneven Surfaces and Methods for Making and Using Them and the PCT International Application which claims priority based on this Provisional Application.

The fluid treatment elements may be positioned along the core assembly in close proximity to, e.g., in contact with, one another along an interface or axially separated from one another. For some embodiments, many, most, or substantially all of the fluid treatment elements 12 may be positioned along the core assembly 11 axially separated from one another. Adjacent fluid treatment elements 12 may be structurally separate from one another within the spaces between them. Further, adjacent end surfaces of adjacent fluid treatment elements 12 may be spaced from one another with no points of contact between them. In addition, one or both end surfaces of each fluid treatment element 12 may immediately face and open directly onto a space, and each space may be bounded by the end surfaces of adjacent fluid treatment elements. For many embodiments, the feed surfaces 33 of adjacent fluid treatment elements 12 may face one another and define a feed space 13 between them, and the permeate surfaces 34 of adjacent elements 12 may face one another and define a permeate space 14 between them. In the embodiment shown in FIG. 1, the permeate spaces 14 may fluidly communicate with the interior 15 of the core assembly 11 via openings 16 in the core assembly 11, and the feed spaces 13 may be fluidly isolated from the interior of the core assembly 11 by a solid wall portion of the core assembly. The distance between adjacent fluid treatment elements 12 may define the width of each space 13, 14, and the widths of the spaces 13, 14 may be uniform or non-uniform. For example, the distances between adjacent feed surfaces 33 and the widths of the feed spaces 13, as well as the distances between adjacent permeate surfaces 34 and the widths of the permeate spaces 14, may be substantially equal to, or different from, one another. Further, the distances between adjacent feed surfaces 33 and the widths of the feed spaces 13 may be substantially equal to, or different from, the distances between adjacent permeate surfaces 34 and the widths of the permeate spaces 14. The spaces 13, 14 may extend between adjacent fluid treatment elements 12 along at least about 85%, or at least about 90%, or at least about 95%, or about 100% of the radial dimension of the fluid treatment elements 12. For example, the spaces 13, 14 may extend at least about 85%, or at least about 90%, or at least about 95%, or about 100% of the distance from the core assembly 11 to the outer rims 35 at the exterior of the elements 12.

The fluid treatment arrangement 10 may further comprise additional components, including a plurality of posts 40 in one or more of the spaces 13, 14 and/or a surround 41 associated with one or more of the spaces 13, 14. The posts may serve as spacers, for example, resisting collapse of the space due to differential pressures. In addition or alternatively, the posts may serve as supports, for example, enhancing the structural integrity of an adjacent fluid treatment element. The surround may be positioned around the inner end or outer end of the space to block fluid flow into or out of the end of the space. For some embodiments, the posts may be positioned in a space but no surround may be associated with the space. For some embodiments, the surround may be associated with the space but no posts may be positioned in the space. For some embodiments, the posts may be positioned in a space and a surround may also be associated with the space.

The number of posts 40 disposed in a space 13, 14 may vary depending, for example, on the size of the fluid treatment elements 12. Fluid treatment arrangements with larger fluid treatment elements may have more posts disposed in a space. Further, the number of posts 40 may vary from space 13, 14 to space 14, 13 within a single fluid treatment element 10. For example, the number of posts in a permeate space, which may be subjected to compressive forces from both axial directions, may be many times the number of posts in a permeate space, e.g., up to about 2 or about 5 or about 10 or about 25 or more times the number of posts in a feed space. For example, for a fluid treatment arrangement with fluid treatment elements having a four inch inner diameter and a six inch outer diameter, the number of posts in a feed space may be in a range from two to about five and the number of posts in a permeate space may be in a range from about eight to about sixteen. As another example, for a fluid treatment arrangement with fluid treatment elements having a one inch inner diameter and a 2½ inch outer diameter, the number of posts in a feed space may be in a range from two to about four and the number of posts in a permeate space may be in a range from about three to about six. These examples are not intended to limit the number of posts in a space. Rather the number of posts in a space may vary considerably from these exemplary ranges depending on several factors, including, for example, the size of the fluid treatment elements, the nature of the permeable fluid treatment medium, the location of the spaces in the fluid stream, and process parameters such as the nominal system pressure and flow rate and the viscosity of the fluid.

Each post may be formed from any of numerous materials. For example, the post may comprise a metallic material or a polymeric material. For some embodiments, the post may comprise a solidified settable bonding material, such as a solidified hot-melt adhesive, polyurethane, or epoxy.

Each post may be configured in any of numerous way. For example, the size and shape of the post may vary. The post may have a length greater than, about equal to, or less than the radial dimension of the adjacent fluid treatment element. For example, the length of the post may be at least about 33⅓% or at least about 50% or at least about 75% or at least about 90% or about 100% of the radial dimension of the fluid treatment element. For some embodiments, the post may extend outwardly along the windings of the fluid treatment element to near the outer rim, to the outer rim, or beyond the outer rim. For some embodiments, the post may extend inwardly to near the inner rim, to the inner rim, or beyond the inner rim. The lateral dimension, e.g., the diameter, of the post may vary in accordance with the width of the space. For some embodiments, the lateral dimension may be somewhat greater than or substantially equal to the width of the space. For other embodiments, the lateral dimension may be less than the width of the space.

Posts may have any of a variety of regular or irregular configurations. For example, the post may be configured as a cylindrical rod or a solidified bead of settable bonding material. The posts may be angled, curved, or straight and may extend radially or nonradially along the windings of the adjacent fluid treatment element. A variety of posts 40 having different configurations and lengths are shown extending along the fluid treatment elements 12 of FIGS. 2 and 4-6.

The plurality of posts 40 in a space 13, 14 may be bonded to the windings along one or both adjacent end surfaces 33, 34 of the fluid treatment elements 12 defining the space 13, 14. Bonding the posts 40 to the windings of an end surface 33, 34 prevents separation of adjacent windings in the region of the bond and fluid bypass between separated windings. For many embodiments, the number of posts 40 bonded to the outflow surface 34 of a fluid treatment element 12 may be larger than the number of posts 40 bonded to the inflow surface 33. Bonding more posts 40 to the outflow surface 34 better maintains the windings of the outflow surface 34 in contact with one another and ensures that no fluid flows from the inflow surface 33 to the outflow surface 34 through separated windings, bypassing the fluid treatment medium 26. Bonding fewer posts 40 to the inflow surface 33 may allow some minor separation of adjacent windings at the inflow surface 34 away from the bonding region. This minor separation allows fluid to flow into the major surfaces 22, 23; 22a, 23a in addition to the side edges 24, 24a; 25, 25a of the ribbon 23, including the permeable fluid treatment medium 26, at the inflow surface 33, increasing the effective surface area of the inflow surface 33. Increasing the effective inflow surface area has many advantages, including increasing dirt capacity and/or service life as disclosed in the previously referenced U.S. Provisional Application No. 60/907,065 entitled Fluid Treatment Elements and Fluid Treatment Arrangements with Fluid Treatment Elements Having Uneven Surfaces and Methods for Making and Using Them and the PCT International Application which claims priority based on this Provisional Application. In addition to bonding the posts 40 to the fluid treatment elements 12, the posts 40 may also be fixed to the core assembly 11. For example, the posts 40 may be bonded to the core assembly 11 or mechanically coupled to the core assembly 11.

The plurality of posts 40 may be the only structure in a space and may be arranged in a space 13, 14 in any of numerous patterns. For some embodiments, the plurality of posts may include a first generally coplanar set of posts extending along windings of one fluid treatment element defining the space and a second generally coplanar set of posts extending along windings of the other fluid treatment element defining the space. The adjacent fluid treatment elements may be positioned next to one another with the first set of posts contacting the second set of posts in the space between the adjacent elements. Alternatively, a plurality of posts 40 may be arranged within the space 13, 14 as a single generally coplanar set, and each post 40 may contact, e.g., may be bonded to, the facing end surfaces 33, 34 of both adjacent fluid treatment elements 12.

The surround 41 may be positioned around an outer end and/or an inner end of one or more spaces 13, 14 and may extend along a portion of the rims 35, 36 of the disk-shaped bodies 21 of the adjacent fluid treatment elements 12 and/or may be bonded to the adjacent fluid treatment elements 12, as shown, for example in FIG. 7. The surround 41 may seal the end of each space 13, 14, blocking the fluid flow into or out of the end of the space 13, 14. Further, the surround 41 may be arranged to expose a substantial portion 42 of the rims 35, 36 of the fluid treatment elements 12 beyond an edge 43 of the surround 41.

The surround may be variously configured. For example, the surround may be configured as a plurality of bands that encircle one or more spaces along the outer end and/or the inner end of each space. As shown in FIG. 7, each band 44 may comprise a bead 45 of impermeable solidified settable bonding material, e.g., solidified hot-melt adhesive, polyurethane or epoxy. The bead 45 of solidified settable bonding material bridges the end of the space 13, 14 and is sealed to the adjacent fluid treatment elements 12. For example, the bead 45 may be bonded to the end surfaces 33, 33; 34, 34 at the outer windings near or at the outer rim 35 or at the inner windings near or at the inner rim 36 of the adjacent fluid treatment elements 12. The bead 45 may extend into the space 13, 14 a short distance along the end surfaces. For some embodiments, the bead 45 may extend into the space 13, 14 a distance which is at least about 10% or at least about 20% or at least about 33⅓% or at least about 50% or more of the width of the ribbon 20. Additionally or alternatively, the bead 45 may extend along all or only a portion of the rims 35, 36 of adjacent fluid treatment elements 12 and may be bonded to the rims 35, 36. For many embodiments, a substantial portion 42 of the rim 35, 36 may remain exposed beyond the edge 43 of the bead 45. For example, the width of an exposed portion 42 of the rim 35, 36 may be at least about 20% or at least about 33⅓% or at least about 50% or at least about 75% of the width of the ribbon 20. Each edge 43 of the bead 45 may be circumjacent to the rim 35, 36 or extend onto the rim 35, 36.

Alternatively, each band 44 may comprise a strip 46 of material, e.g., impermeable polymeric material. The strip of material may alternatively be permeable but less permeable than the ribbon. Each strip 46 may bridge the end of the space 13, 14, with or without extending into the space, and may extend onto all or a portion of the rim 35, 36 of each adjacent fluid treatment element 12. The strip 46 may be bonded to the fluid treatment elements 12, e.g., adhesively bonded, solvent bonded, or heat-bonded to the rims 35, 36, sealing the strip 46 to the fluid treatment elements 12. For many embodiments, substantial portion 42 of the rim 35, 36 may remain exposed beyond the edge 43 of the strip 46. For example, the width of the exposed portion 42 of the rim 35, 36 may be at least about 20% or at least about 33⅓% or at least about 50% or at least about 75% of the width of the ribbon 20.

The surround 41 may be positioned around an end of a space 13, 14 without posts in the space 13, 14, as shown in FIG. 7. For instance, the spaces may be substantially free of structure, for example, as disclosed in U.S. Provisional Application No. 60/907,068 entitled Fluid Treatment Elements and Fluid Treatment Arrangements with Spaces Between Fluid Treatment Elements and Methods for Making and Using Them, which listed Thomas Welch, Jr., Tanweer ul Haq, and Joseph Verschneider as an inventor and which was filed on Mar. 19, 2007, and the PCT International Application which claims priority based on this Provisional Application, both of which are incorporated by reference to support these and other features. Alternatively, the surround 41 may be positioned around an end of a space 13, 14 with posts 40 in the space 13, 14, as shown in FIG. 1. The posts may or may not be bonded to the surround.

Fluid treatment arrangements may be made in any of several different ways. For example, methods for making a fluid treatment arrangement may comprise positioning first and second spirally wound, disk-shaped fluid treatment elements along a hollow core assembly axially separated from one another to define a space between end surfaces of the first and second fluid treatment elements.

The fluid treatment elements may be positioned along the core assembly in a variety of ways. For example, at least two and as many as at least 10 or more, or at least 25 or more, or at least 50 or more or at least 100 or more ribbons may be spirally wound in a plurality of windings around the core assembly to form fluid treatment elements at different axial locations along the core assembly. All of the fluid treatment elements may be axially separated by spaces, or some of the fluid treatment elements may be side-by-side in close proximity, e.g., in contact, while other fluid treatment elements may be axially separated by spaces from adjacent fluid treatment elements. All of the fluid treatment elements may have identical or similar treatment characteristics. Alternatively, the fluid treatment elements may have different treatment characteristics, for example, as disclosed in U.S. Provisional Application No. 60/907,069 entitled Fluid Treatment Elements and Fluid Treatment Arrangements with Fluid Treatment Elements Having Different Fluid Treatment Characteristics and Methods for Making and Using Them, which listed Thomas Welch Jr., Mark Hurwitz, Tanweer ul Hag, and Joseph Verschneider as an inventor and which was filed on Mar. 19, 2007, and the PCT International Application which claims priority based on this Provisional Application, both of which are incorporated by reference to support these and other features.

The ribbons may be wound around the core assembly one at a time, several at a time, or all at the same time, e.g. either sequentially or simultaneously. The inner end region of the ribbon, e.g., the region defining the first one, two, or three windings, may be sufficiently sealed against the core assembly to prevent bypass of the fluid treatment element. For example, the inner end region may be fixed to the core assembly by heat bonding, adhesively bonding, or solvent bonding the inner end region to the core assembly. Alternatively, the inner end region may not be bonded to the core assembly but may, for example, be compressively fit against the core assembly by tightly winding the initial windings around the core assembly. Further, the inner end region may have a tapered thickness or may be sufficiently tightly wound that no step is formed at the transition between the end of the first winding and the beginning of the second winding.

Each ribbon may be spirally wound in a plurality of windings under tension to form a fluid treatment element of any desired radial dimension. The tension may be constant or may vary with increasing radius of the fluid treatment element, and the tension may be empirically selected based on many factors. For example, a maximum tension at which the ribbon detrimentally elongates, e.g., the tension at which the fluid treatment medium unduly stretches or begins pulling apart, may be determined. The ribbon may then be spirally wound using a tension less than the maximum tension, for example, no greater than about 80% or no greater than about 65% or no greater than about 50% of this maximum tension. Further, the ribbon may be spirally wound using a tension which provides similar compression, e.g., substantially uniform compression, of the fluid treatment medium from one winding to the next along most or all of the radial dimension of the fluid treatment element. By providing similar compression from one winding to the next, the fluid treatment element may more evenly treat the fluid flowing edgewise through the plurality of windings of the fluid treatment medium. For example, if the fluid treatment medium comprises a filter medium, the fluid treatment element may be more uniformly loaded along the radial dimension of the element, increasing the dirt capacity and/or the service life of the element. In addition, the ribbon may be spirally wound with sufficient tension to inhibit or prevent the flow of fluid laterally between adjacent surfaces of adjacent windings and adjacent layers of the ribbon. For example, the ribbon may be spirally wound with sufficient tension that substantially no fluid passes laterally between the adjacent surfaces and adjacent layers or with sufficient tension that any fluid pathway laterally between the adjacent surfaces and adjacent layers of the ribbon has a permeability and/or a removal rating which is not substantially greater or coarser than the permeability and/or removal rating of the fluid pathway edgewise through the fluid treatment medium. The ribbon may also be wound with sufficient tension to form a substantially self-supporting fluid treatment element having a stable, firm disk-shaped body. For example, the ribbon may be wound with sufficient tension to hold adjacent windings and adjacent layers against each other tightly enough to prevent lateral slippage and/or radial separation of the adjacent windings and adjacent layers at the differential pressures encountered by the fluid treatment element.

After each ribbon has been spirally wound to a desired radial dimension, the outer end region of the ribbon may be held in place in any of numerous ways. For example, the outer end region may be bonded to the adjacent winding for example, by heat bonding, adhesive bonding, or solvent bonding. Alternatively or additionally, the outer end region of the ribbon may be staked to other windings. For example, a hot, metal pin may be inserted generally radially through the outer end region of the ribbon and the outer windings, melting the portions of the ribbon that contact the pin. When the pin is withdrawn, the molten portions solidify with one another, forming a generally radial stake which holds the outer end region, including any multiple layers of the ribbon, and the outer windings in place. Alternatively or additionally, a hollow needle, which may or may not be hot, may be inserted generally radially through the outer end region and the outer windings or in the space between adjacent windings. A liquid settable bonding composition or material, including, for example, a hot melt adhesive, a polyurethane, or an epoxy may be injected into the windings as the needle is withdrawn, forming a generally radial stake which holds the outer end region and the windings in place.

The stability of a spirally wound fluid treatment element may be further enhanced by staking much or all of the disk-shaped body. For example, generally radially extending stakes may be formed through most or substantially all of the windings and/or at various angularly-spaced positions around the disk-shaped body. Each stake may extend mostly or completely through the fluid treatment element, e.g., to the core assembly, fixing the fluid treatment to the core assembly.

The stability of a spirally wound fluid treatment element may also be enhanced by bonding adjacent windings, and/or adjacent layers of the ribbon, to one another continuously or intermittently along the length of the spirally wound ribbon. Adjacent windings and/or layers may be bonded in a variety of ways. For example, the ribbon may include a bonding layer, as previously described. The bonding layer may comprise an adhesive which bonds adjacent windings and/or layers as the ribbon is spirally wound. Alternatively, the bonding layer may be activated by applying a solvent or heat to the fluid treatment element after the element is formed. As yet another alternative, a hot melt adhesive or a heat bond may be applied, for example, intermittently, between adjacent windings and/or layers as the ribbon is spirally wound.

Methods for making a fluid treatment arrangement may also comprise positioning a plurality of posts along a plurality of windings of at least one end surface of at least one fluid treatment element. For some embodiments, the posts may be positioned along the end surfaces which face a space, e.g., either a feed space or a permeate space, between adjacent fluid treatment elements. More posts may be positioned in a permeate space than a feed space. The posts may be inserted into the space in a variety of ways. For example, solid posts may be inserted into the space at angularly spaced intervals and may be bonded to the windings of one or both fluid treatment elements and/or fixed to the core assembly, e.g., by an adhesive bond, a solvent bond, or a heat bond.

Alternatively, a liquid settable bonding material, e.g., a hot-melt adhesive, a polyurethane, or an epoxy, may be applied along a plurality of windings of a fluid treatment element within the space. For example a hollow needle or nozzle may be inserted into the space between adjacent fluid treatment elements to a desired depth and then withdrawn. As the nozzle is withdrawn, the liquid settable bonding material may be supplied from the nozzle into the space as a bead which extends from an inner region of the space to an outer region. For example, the bead may contact the core assembly and extend to near the outer rims of the adjacent fluid treatment elements. The bead may extend in a generally straight radial or non-radial direction, and the bead may be wide enough to contact the windings of both adjacent fluid treatment elements at the same time as the nozzle is withdrawn. The nozzle may be repeatedly inserted and withdrawn at angularly spaced intervals, depositing a plurality of beads with the space. The settable bonding material may be solidified in the space between the fluid treatment elements. The liquid bonding material may have a viscosity which allows the bead to slightly penetrate the side edges of the ribbon, including the permeable fluid treatment medium, and/or between windings of the ribbon yet generally maintain the structure of the bead as the settable bonding material solidifies. Solidifying the settable bonding material then results in a plurality of posts within the space bonded to the windings of one or both fluid treatment elements.

Additionally or alternatively, methods for making a fluid treatment arrangement may include associating a surround with one or more spaces between the fluid treatment elements. For example, the methods may comprise positioning a band around an end of the space and along the rims of the adjacent fluid treatment elements to seal the space and exposing a portion of the rim of at least one of the fluid treatment elements beyond an edge of the band. As another example, the methods may comprise applying a liquid settable bonding material around an end of the space and in contact with the adjacent fluid treatment elements and solidifying the settable bonding material to seal the end of the space.

For some embodiments, a strip of impermeable material, e.g., impermeable polymeric material, may be wrapped around the inner or outer end of a space and a portion of the outer rims of the adjacent fluid treatment elements. The strip may be bonded to the inner or outer rim, sealing the inner or outer end of the space and exposing a substantial portion of each rim beyond an edge of the strip.

For some embodiments, a liquid settable bonding material, e.g., a hot-melt adhesive, a polyurethane, or an epoxy, may be applied around the inner end or the outer end of a space between adjacent fluid treatment elements. For example, a needle or a nozzle may be inserted into the space and the liquid bonding material may be supplied from the nozzle as a bead around the inner end of the space. The bead may be large enough to contact the inner windings of both fluid treatment elements at or near the inner rims. The bead may or may not extend along a portion of the inner rims. Alternatively, the nozzle may be positioned between the outer rims of adjacent fluid treatment elements and the liquid bonding material may be supplied from the nozzle as a bead around the outer ends of the space. Again, the bead may be large enough to contact the outer windings of both fluid treatment elements at or near the outer rims, and the bead may or may not extend along a portion of the outer rims. The settable bonding material may then be solidified at the inner ends or outer ends of the space. The liquid bonding material may have a viscosity which allows the bead to slightly penetrate the side edges and/or major surfaces of the ribbon, including the permeable fluid treatment medium, and/or between windings of the ribbon yet generally maintain the structure of the bead as the settable bonding material solidifies. Solidifying the settable bonding material then results in a band which encircles the inner end or the outer end of the space and is securely bonded to the adjacent filter elements, sealing the end of the space. Further, a substantial portion of the outer rims of the adjacent filter elements may remain exposed beyond the edges of the band.

After the fluid treatment arrangements are formed, they may be contained within a wide variety of housings to provide fluid treatment assemblies. The fluid treatment assembly may comprise a housing containing only a single fluid treatment arrangement or a housing containing multiple fluid treatment arrangements arranged serially or in parallel within the housing. For example, the housing may include one or more tube sheets and multiple fluid treatment arrangements may be associated with the tube sheets. The housing may permanently contain the fluid treatment arrangement, e.g., forming a disposable fluid treatment arrangement, or the housing may removably contain the fluid treatment arrangement, allowing a used fluid treatment arrangement to be replaced by a new fluid treatment arrangement in a reusable housing.

The housing may be formed from any impermeable material, e.g., a metallic material or a polymeric material, which is compatible with the process parameters, e.g., the pressure and temperature and chemical composition of the fluid. The housing may have two or more principle ports, e.g., a process or feed fluid inlet port and a filtrate or permeate outlet port. The housing may define a fluid flow path between the ports, and the fluid treatment arrangement may be positioned in the housing in the fluid flow path. The ports may be situated on the housing in any of numerous configurations, including an in-line configuration, a T-type configuration, or an L-type configuration, and the ports may comprise any of a wide variety of fittings. The housing may further include additional ports, including, for example, a retentate or concentrate outlet port and one or more ports associated with draining, venting, or cleaning, e.g., backwashing.

Figure 8:
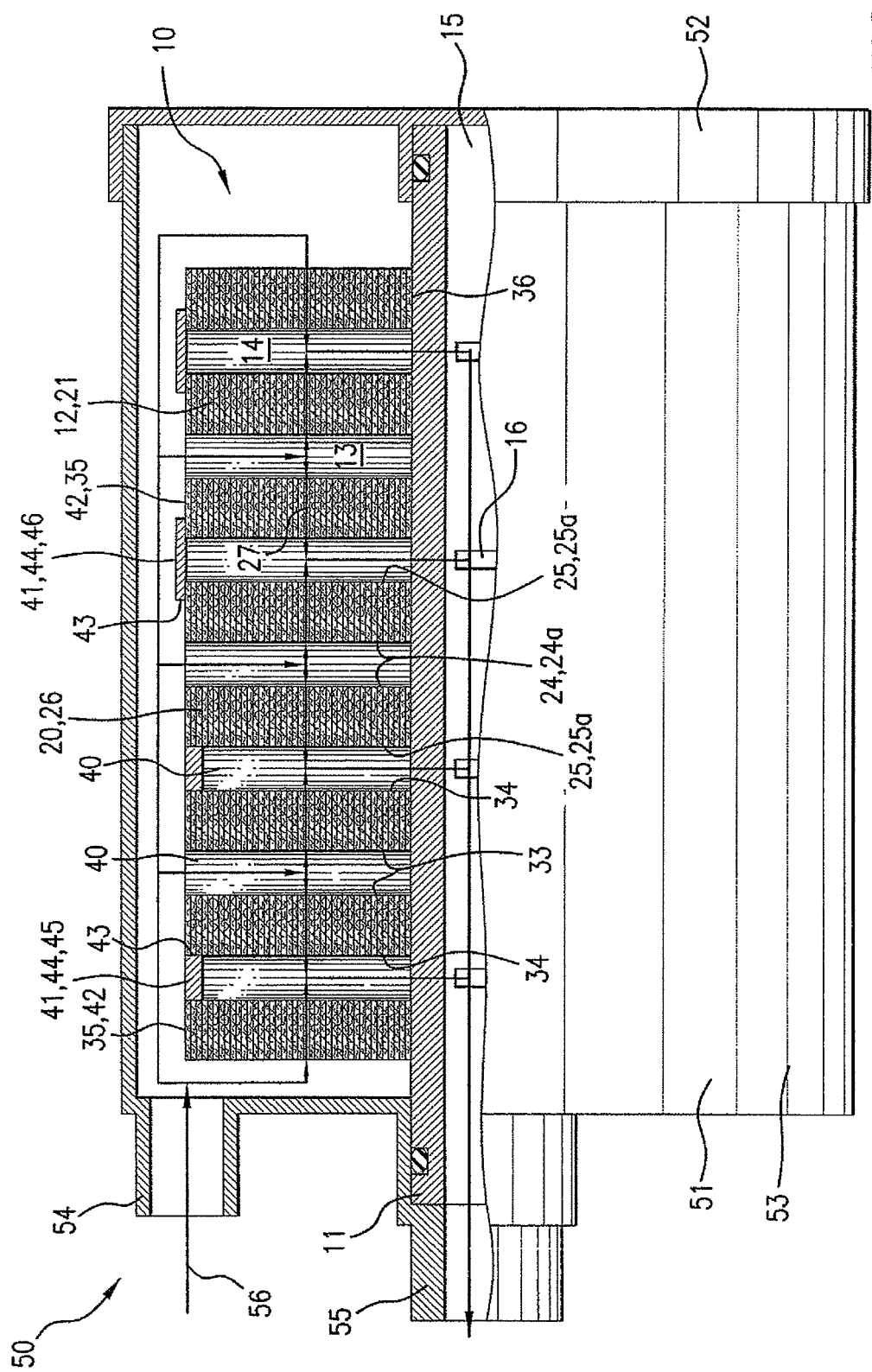
FIG. 8 is a quarter sectioned view of a fluid treatment assembly including the fluid treatment arrangement of FIG. 1.

One of many examples of a fluid treatment assembly 50 and a housing 51 containing at least one fluid treatment arrangement 10 is shown in FIG. 8, but fluid treatment assemblies and housings are not limited to the features illustrated in FIG. 8. The housing 51 may include a cover 52 and a shell 53. The cover 52 may be permanently or removably mounted to the shell 53 at one end of the shell 53. The other end of the shell 53 may have a feed inlet port 54, e.g., an off center feed inlet port, and a permeate outlet port 55, e.g., a central permeate outlet port. The illustrated embodiment of the fluid treatment assembly 50 has only two ports 54, 55 and they are located on one end of the housing 51. Other embodiments may include more than two ports and the ports may be located anywhere along the housing, e.g., at both ends and/or in the side of the housing. The fluid treatment arrangement 10 may be sealed within the housing 51 across a fluid flow path 56 between the feed inlet port 54 and the permeate outlet port 55 with the shell 53 surrounding the fluid treatment elements 12. For example, one end of the hollow core assembly 11 may be blindly sealed against the cover 52. The opposite end of the hollow core assembly 11 may be open and sealed to the shell 53 at the permeate outlet port 55, allowing fluid communication between the interior 15 of the core assembly 11 and the permeate outlet port 55. For many embodiments, none of the fluid treatment elements 12 may be sealed to the housing 51.

For example, only the core assembly 11 may be sealed to the housing 51, minimizing seals and providing a highly reliable fluid treatment assembly.

Fluid may be treated in any of numerous ways by fluid treatment assemblies, arrangements, and elements embodying the invention. In one mode of operation, a feed fluid may be directed between the exterior of a fluid treatment arrangement and the interior of a core assembly. The fluid may pass generally edgewise through the windings of a spirally wound strip of a permeable fluid treatment medium, where the fluid is treated in any of a variety of ways. The fluid may also pass through a space adjacent to the spirally wound strip past posts that are bonded to the windings.

In the illustrated fluid treatment assembly 50, the feed fluid is directed along the fluid flow path 56 outside-in through the fluid treatment arrangement 10 from the exterior of the fluid treatment elements 12 to the interior 15 of the core assembly 11. However, in other embodiments the feed fluid may be directed inside-out through the fluid treatment arrangement from the interior of the core assembly to the exterior of the fluid treatment elements. The feed fluid may enter the housing 51 through the feed inlet port 54 and follow the fluid flow path 56 to the permeate outlet port 55. From the feed inlet port 54, the feed fluid may flow generally axially along the housing 51 between the exterior of the fluid treatment elements 12 and the interior of the shell 53. The feed fluid then flows generally radially inwardly along the posts 40 into the feed spaces 13 between the feed surfaces 33 of the fluid treatment elements 12. From the feed spaces 13, the feed fluid may flow generally axially past the posts 40 into the feed surfaces 33 of the fluid treatment elements 12 and through the disk-shaped bodies 21 of the fluid treatment elements 12. Fluid may also flow into the fluid treatment elements 12 generally radially through the exposed portions 42 of the outer rims 35. The exposed portions 42 of the rims 35 thus increase the effective inflow surface area, which substantially benefits performance. For example, the dirt capacity and/or service life of the fluid treatment arrangement 10 may be increased by up to 25% or more or up to 50% or more over a similar fluid treatment arrangement without any exposed portions.

Fluid flowing along the fluid flow path 56 into each fluid treatment element 12 may flow generally edgewise along the fluid pathway 27 through the ribbon 20, including the fluid treatment medium 26, of each winding from the feed side edge 24, 24a to the permeate side edge 25, 25a. Fluid may also flow from the permeable fluid treatment medium of one winding radially into and then laterally along the permeable medium of one or more adjacent or nearby windings. As the fluid flows through the fluid treatment medium 26, it may be treated in any of numerous ways, depending, for example, on the fluid treatment characteristic of the fluid treatment medium. The treated fluid emerges from the permeate surfaces 34 of the fluid treatment elements 12 and flows past the posts 40 into the permeate spaces 14 between the permeate surfaces 34 of the fluid treatment elements 12. From the permeate spaces 14, the treated fluid may flow generally radially inwardly along the posts 40 through the openings 16 into the interior 15 of the core assembly 11. The treated fluid then flows axially along the interior 15 of the core assembly 11 to and through the permeate outlet port 55 of the housing 41.

Many advantages are associated with fluid treatment assemblies, arrangements, and elements embodying one or more aspects of the invention. For example, by providing posts in one or more of the spaces, the spaces can be protected against collapse without significantly increasing the resistance to fluid flow through the spaces. By bonding the posts to the windings of the fluid treatment elements, the windings can be protected against separation, enhancing the reliability and efficiency of the fluid treatment arrangement. By bonding fewer posts to the inflow surface and more posts to the outflow surface, the effective surface area of the inflow surface can be significantly increased, enhancing the performance of the fluid treatment arrangement while maintaining reliability. By applying a liquid settable bonding composition in the spaces, both the posts and the bands of the surround may be quickly and effectively formed and bonded to the adjacent fluid treatment elements, speeding manufacture and enhancing reliability. Further, by positioning a surround around the ends of a space while exposing a significant portion of the rims of the adjacent fluid treatment elements, the performance of the fluid treatment arrangement can be greatly improved.

In addition, spirally winding separate ribbons to separately form each of the plurality of fluid treatment elements facilitates manufacturing different configurations of fluid treatment arrangements and elements. The radial dimension of each element may be easily varied by winding more or less of the ribbon around the core assembly; the number of fluid treatment elements provided along the core assembly can be easily varied by winding more or fewer ribbons around the core assembly; and the location of the fluid treatment elements along the core assembly can be easily varied by simply adjusting the spacing between the ribbons being wound around the core assembly. Further, the ribbons may be spirally wound around the core assembly very quickly, speeding manufacture. Using a plurality of separate, narrow ribbons instead of, for example, a single, wide sheet with slots or other through holes in the sheet may then significantly enhance the flexibility and efficiency of manufacture, allowing fluid treatment arrangements with various numbers of elements and spacings between elements to be made without having to change out sheets of different widths or different through hole configurations. In addition, if a defect such as a hole or tear in the permeable fluid treatment medium occurs during manufacture, only the defective ribbon may be replaced rather than an entire sheet, allowing for faster and more efficient production.

While various aspects of the invention have been previously described and/or illustrated with respect to several embodiments, the invention is not limited to these embodiments. For instance, one or more features of these embodiments may be eliminated or modified, or one or more features of any embodiment may be combined with one or more features of other embodiments, without departing from the scope of the invention.

Figure 9:
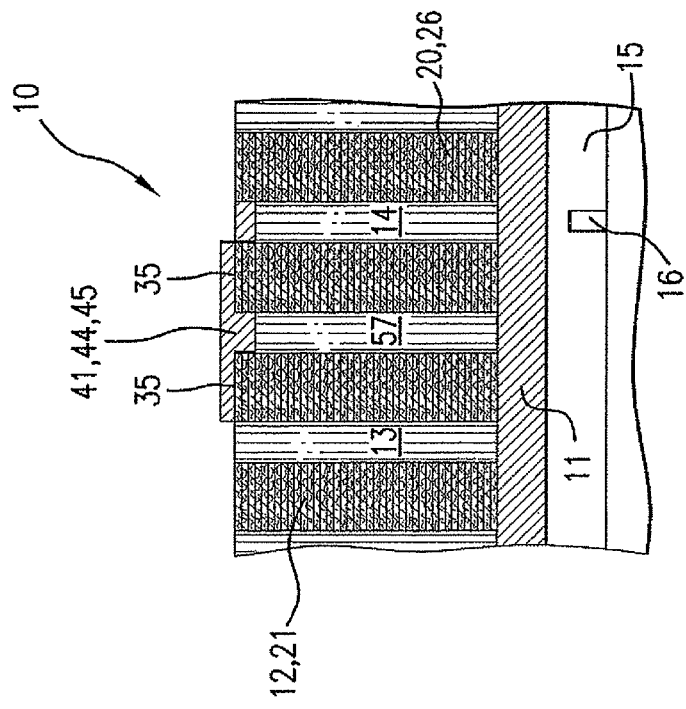
FIG. 9 is a sectioned view of a portion of a fluid treatment arrangement.

For example, some of the spaces between adjacent fluid treatment elements may be arranged to be fluidly isolated from both the interior of the core assembly and the exterior of the fluid treatment elements. A portion of a fluid treatment arrangement 10, including fluid treatment elements 12, a core assembly 11, a surround 41, and posts 40, is shown in FIG. 9. The fluid treatment elements 12, the core assembly 11, the surround 41, and the posts 40 illustrated in FIG. 9 may be identical to those previously described, but neither the fluid treatment arrangement, the fluid treatment elements, the core assembly, the posts, nor the surround are limited to the features shown in FIG. 9. Each fluid treatment element 12 may comprise a ribbon 20, including a fluid treatment medium 26, which is spirally wound to form a disk-shaped body 21. The fluid treatment arrangement 10 may include an intermediate space 57 positioned between a feed space 13 and a permeate space 14. The intermediate space 57 may be fluidly isolated from the interior 15 of the core assembly 11 by a solid wall portion of the core assembly 11 and may be fluidly isolated from the exterior of the fluid treatment elements 12 by the surround 41. For example a band 44 comprising a bead 45 of solidified settable bonding material may encircle the outer end of the intermediate space 57 and extend completely over the outer rims 35 of the adjacent fluid treatment elements 12, sealing both the outer end of the intermediate space 57 and the outer rims 35 of the fluid treatment elements 12. The band 44 may be formed as previously described by applying a bead of liquid settable bonding material around the outer end of the intermediate space and extending the bead along the outer rims. The bead of liquid settable bonding material may or may not be doctored to smooth the outer surface of the bead and reduce the thickness of the bead along the outer rims. The liquid settable bonding material may then solidify. The intermediate space may include a plurality of posts 40 and may or may not include a functional material. Fluid may flow generally radially into a feed space 13; generally axially through one fluid treatment element 12, the intermediate space 57, and an adjacent fluid treatment element 12 to a permeate space 14; and then generally radially out of the permeate space 14 through the opening 16 into the interior 15 of the core assembly 11.

As yet another example, fluid treatment elements may be positioned along the core assembly by sliding preformed elements generally axially along the core assembly. For example, each ribbon may be spirally wound in a plurality of windings to a desired radial dimension around a central hub, rather than around the core assembly, to form a fluid treatment element. The fluid treatment elements thus formed may then be slid axially, with or without the hub, along the core assembly to the desired locations and fixed in place. Posts may be bonded to one or both end surfaces of the fluid treatment element either before or after the fluid treatment element has been slid onto the core assembly. For example, prior to sliding the fluid treatment element onto the core assembly, a plurality of solid posts may be bonded to one or both end surfaces of the element. Alternatively, a plurality of beads of liquid settable bonding material may be applied to one or both end surfaces and allowed to solidify. The preformed fluid treatment element with the posts may then be slid axially onto the core assembly until the posts contact the end surface of the adjacent fluid treatment element or the posts on the end surface of the adjacent fluid treatment element, forming a space between the elements. The bands of a surround may be positioned around the ends of the space as previously described.

Further, embodiments having different features may nonetheless be within the scope of the invention. For example, each ribbon may be spirally wound around a hub to form a fluid treatment element. Each hub may comprise a section of the core assembly, and the hub sections of adjacent elements may be connected to one another to form the hollow core assembly and the fluid treatment arrangement. The hub sections may be mechanically coupled to one another and/or bonded to one another, and some of the hub sections may include openings which allow fluid communication with the interior of the core assembly. The posts may be bonded to the end surfaces of the fluid treatment elements and the bands of a surround may be positioned around the ends of the spaces as previously described.

As another example, a sheet assembly may comprise a sheet of the porous fluid treatment medium as the sole component or as one layer of a multilayer composite, e.g., similar to the multilayer composite of the ribbon. The sheet assembly may be spirally wound in a plurality of windings to form a roll having a desired radial dimension. Sections having a desired width may then be cut, e.g., sliced, from the roll in a direction perpendicular to the axis of the roll to form the fluid treatment elements. The fluid treatment elements may then be positioned along a core assembly, e.g., by axially sliding preformed elements along the core assembly, or the fluid treatment elements may be positioned on hub sections and the hub sections may be connected to one another to form fluid treatment arrangement including the hollow core assembly. The posts may be bonded to the end surfaces of the fluid treatment elements before or after the fluid treatment elements are slid onto the core assembly and the bands of a surround may be positioned around the ends of the spaces, as previously described.

As yet another example, a fluid treatment arrangement may include multiple sets, e.g., two, three, four or more sets, of fluid treatment elements which are mounted along the core assembly radially displaced from one another, for example, in a manner similar to that disclosed in U.S. Provisional Application No. 60/907,066 entitled Fluid Treatment Arrangements with Sets of Fluid Treatment Elements and Methods for Making and Using Them, which listed Thomas Welch, Jr., Tanweer ul Haq, and Joseph Verschneider as an inventor and which was filed on Mar. 19, 2007, and the PCT International Application which claims priority based on this Provisional Application, both of which are incorporated by reference to support these and other features. Each set may include a plurality of fluid treatment elements, each element including a ribbon which is spirally wound in a plurality of windings to form a generally disk-shaped body having a radial dimension. The outer set of fluid treatment elements may overlie the inner set of fluid treatment elements with the elements of the inner and outer sets radially and/or axially aligned or offset. For example, the elements of the outer set may bridge at least some of the spaces between the elements of the inner set. Further, the size, e.g., the width and radial dimension, and/or the treatment characteristics of the outer set of fluid treatment elements may be the same as or different from those of the inner set of fluid treatment elements.

Figure 10:
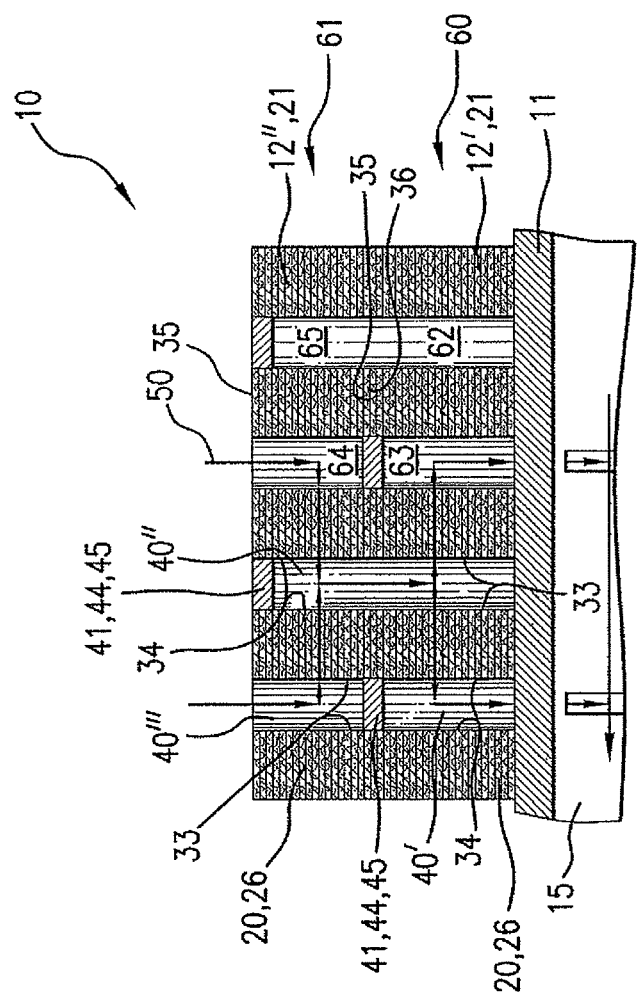
FIG. 10 is a sectioned view of a portion of another fluid treatment arrangement.

In the embodiment shown in FIG. 10, a fluid treatment arrangement 10 may include at least inner and outer sets 60, 61 of fluid treatment elements 12', 12" mounted along a core assembly 11. Each fluid treatment element 12', 12" of each set 60, 61 may comprise a ribbon 20, including a fluid treatment medium 26, which is spirally wound to form a disk-shaped body 21. The inner set 60 of fluid treatment elements 12' may be positioned along and immediately circumjacent to the core assembly 11 as previously described with feed and permeate spaces 62, 63 between adjacent inner fluid treatment elements 12'. An inner surround 41 comprising, for example, a plurality of inner bands 44, may bridge the inner permeate spaces 63 between adjacent inner fluid treatment elements 12'. The inner bands 44 may comprise solidified beads 45 of settable bonding material bonded to the adjacent disk-shaped bodies 21 near the outer diameter of the inner fluid treatment elements 12' and the inner diameter of the outer fluid treatment elements 12". Alternatively, the inner band may be a strip of material which bridges the inner permeate space and extends along the outer rims of both adjacent inner fluid treatment elements. A plurality of posts 40' may extend from each solidified inner bead 45 to the core assembly 11 angularly spaced from one another. The posts 40' may be positioned in the inner permeate spaces 63 as previously described. For example, after the inner fluid treatment elements 12' are wound around the core assembly 11, the posts 40' may be applied as a liquid settable bonding material and allowed to solidify. A bead 45 of liquid settable bonding material may then be applied around each permeate space 63 on top of the posts 40', as previously described. The bead 45 may solidify, bonding the bead 45 to the windings of the end surfaces of the adjacent inner fluid treatment elements 12' and/or outer fluid treatment elements 12" and to the tops of the posts 40'. The features of the core assembly 11, the fluid treatment elements 12', 12", the inner permeate spaces 63 and the inner bands 44 may be similar to those previously described.

Radially displaced from the inner set 60 of fluid treatment elements 12', the outer set 61 of fluid treatment elements 12" may be positioned along the core assembly 11 with feed and permeate spaces 64, 65 between the outer fluid treatment elements 12". The outer fluid treatment elements 12" may be spirally wound around the inner fluid treatment elements 12' and/or the inner surround 41, e.g., the inner bands 44. The inner end region of the ribbon of each outer fluid treatment element 12" may be sealed against the inner fluid treatment elements 12' or the inner bands 44 as previously described for the inner end region of the ribbon of each fluid treatment element 12 and the core assembly 11. Where the fluid treatment elements of the inner and outer sets have the same fluid treatment characteristics and are radially aligned, the inner and outer fluid treatment elements may be formed by winding a continuous ribbon, including the fluid treatment medium, from the core assembly to the exterior of the fluid treatment arrangement. The size of each outer fluid treatment element 12" may be the same as or different from the size of each inner fluid treatment element 12'. An outer surround 41 comprising, for example, a plurality of outer bands 44, may bridge the outer permeate spaces 65 between adjacent outer fluid treatment elements 12". The outer bands 44 may also comprise solidified beads 45 of settable bonding material bonded to the adjacent disk-shaped bodies 21 near the outer diameter of the outer fluid treatment elements 12". A plurality of posts 40" may extend from each solidified outer bead 45 to the core assembly 11 through an outer permeate space 65 and an inner feed space 62. The posts 40" may be positioned in the same manner as the posts 40' in the inner permeate space 63. The outer beads 45 may be applied on top of the posts 40" in the outer permeate spaces 65 as a bead of liquid bonding composition. The liquid bonding composition solidifies, bonding the outer beads 45 to the windings of the end surfaces 34, 34 of the adjacent outer fluid treatment elements 12" and the tops of the posts 40". A plurality of posts 40" may also be positioned in the feed spaces 64 between the outer fluid treatment elements 12" in a manner similar to the posts 40' in the inner permeate spaces 63. However, no outer bead may be applied to the tops of the posts 40'''. For many embodiments, all of the posts 40', 40", 40''' may be bonded to the disk-shaped bodies 21 of adjacent fluid treatment elements 12', 12". The features of the fluid treatment elements 12", the outer spaces 64, 65, and the outer bands 44 may be similar to those previously described.

The inner and outer sets of fluid treatment elements and the inner and outer surrounds may be arranged to direct fluid in series and/or in parallel axially through one or more outer fluid treatment elements and axially through one or more inner fluid treatment elements as the fluid flows from the exterior of the fluid treatment arrangement to the interior of the core assembly or vice versa. For example, in the embodiment of FIG. 10, the outer feed spaces 64 may be open to the exterior of the fluid treatment arrangement 10 and closed along the inner diameter of the outer elements 12" by the inner bands 44. The outer permeate spaces 65 may be isolated from the exterior of the fluid treatment arrangement 10 by the outer bands 44 and open to the inner feed spaces 62 along the inner diameter of the outer elements 12". The inner feed spaces 62 may be closed along the inner diameter of the inner fluid treatment elements 12' by a solid wall of the core assembly 11. The inner permeate spaces 63 which are closed by the inner bands 44 may open into the interior 15 of the core assembly 11 though the openings 16 in the core assembly 11.

Fluid treatment arrangements having multiple, radially displaced sets of fluid treatment elements may be contained within a wide variety of housings to provide fluid treatment assemblies, as previously described for the embodiments of FIGS. 7 and 8.

In one mode of operation feed fluid may be directed through the fluid treatment arrangement 10 along a fluid flow path 50 between the exterior of the fluid treatment arrangement 10 and the interior 15 of the core assembly 11. For example, in the embodiment of FIG. 10, feed fluid may be directed generally radially into the open outer feed spaces 64 along the posts 40''', further radial flow being blocked by the inner bands 44. From the open outer feed spaces 64 the feed fluid may flow generally axially through the outer fluid treatment elements 12" into the outer permeate spaces 65 that are isolated from the exterior of the fluid treatment arrangement 10 by the outer bands 44. Feed fluid may also flow into the outer fluid treatment elements 12" radially via the exposed outer rims 35. As the fluid flows through the outer fluid treatment elements 12", the fluid may pass generally edgewise through the fluid treatment medium of each winding. The fluid may also flow from the permeable fluid treatment medium of one winding radially into and then laterally along the permeable medium of one or more adjacent windings. As the fluid flows through the outer fluid treatment elements 12", the fluid is treated. From the isolated outer permeate spaces 65, the fluid may flow along the posts 40" generally radially into the inner feed spaces 62 that open onto the outer permeate spaces 65, further radial flow being blocked by the solid wall of the core assembly 11. From these inner feed spaces 62, the fluid may flow generally axially through the inner fluid treatment elements 12' into the inner permeate spaces 63 that are isolated from the outer feed spaces 64 by the inner bands 44. Fluid may also flow into the inner fluid treatment elements 12' radially via the inner rims 36 of the outer fluid treatment elements 12" and the outer rims 35 of the inner fluid treatment elements 12'. As fluid flows through the inner fluid treatment elements 12', the fluid may pass generally edgewise through the fluid treatment medium of each winding. The fluid may also flow from the permeable fluid treatment medium of one winding radially into and then laterally along the permeable medium of one or more adjacent windings. As the fluid flows through the inner fluid treatment elements 12', the fluid is again treated. The fluid treatment elements 12', 12" of the inner and outer sets 60, 61 may have identical or similar fluid treatment characteristics or they may have different fluid treatment characteristics, and the fluid may be treated accordingly. From the inner permeate spaces 63 the fluid may flow along the posts 40' generally radially through the openings 16 into the interior 15 of the core assembly 11.

The present invention is thus not restricted to the particular embodiments which have been described and/or illustrated herein but includes all embodiments and modifications that may fall within the scope of the claims.

The invention claimed is:

1. A fluid treatment arrangement comprising:
a hollow core assembly having an interior and an axis;
first and second adjacent fluid treatment elements mounted along the core assembly, the first fluid treatment element being axially separated from the second fluid treatment element and defining a space between them, wherein each fluid treatment element includes a ribbon which has a permeable fluid treatment medium and is spirally wound in a plurality of windings to define a generally disk-shaped body having a radial dimension, a first end surface on one side of the body, a second end surface on the other side of the body, and an outer rim, wherein the windings include a first winding having first and second opposite major surfaces a second winding adjacent to the first major surface of the first winding, and a third winding adjacent to the second major surface of the first winding;

a plurality of posts positioned in the space between the first and second fluid treatment elements, each post extending along windings including the first, second, and third windings of at least one of the first and second fluid treatment elements; and a fluid pathway which extends between the first and second end surfaces of each fluid treatment element generally edgewise through the permeable fluid treatment medium to or from the space past the posts.

2. The fluid treatment arrangement of claim 1 wherein each post extends along and is bonded to windings of at least one of the first and second fluid treatment elements.

3. The fluid treatment arrangement of claim 1 further comprising a surround which encircles the space and fluidly blocks an outer end of the space.

4. The fluid treatment arrangement of claim 1 wherein the core assembly has an opening and the space fluidly communicates with the interior of the core assembly via the opening.

5. The fluid treatment arrangement of claim 1 wherein the space is fluidly isolated from the interior of the core assembly and fluidly communicates with the exterior of the fluid treatment elements.

6. A fluid treatment assembly comprising a housing and a fluid treatment arrangement of claim 1 disposed inside the housing, wherein the housing has first and second ports and defines a fluid flow path between the first and second ports, the fluid treatment arrangement being positioned in the housing across the fluid flow path, the fluid pathway being a portion of the fluid flow path.

7. A fluid treatment arrangement comprising:

a hollow core assembly having an interior and an axis;

a plurality of disk-shaped fluid treatment elements, wherein each fluid treatment element includes a ribbon which has at least one strip of a permeable fluid treatment medium having first and second opposite side edges, wherein the ribbon is spirally wound in a plurality of windings, including a first winding having first and second opposite major surfaces, a second winding adjacent to the first major surface of the first winding, and a third winding adjacent to the second major surface of the first winding; and defines a first axially-facing end surface comprising a plurality of windings of the first side edge of the permeable fluid treatment medium strip, a second axially-facing end surface comprising a plurality of windings of the second side edge of the permeable fluid treatment medium strip, and an outer rim, wherein the plurality of fluid treatment elements are positioned along the core assembly with at least some of the adjacent fluid treatment elements axially separated from one another and defining a plurality of first spaces and a plurality of second spaces, each first space extending between the first end surfaces of adjacent fluid treatment elements and each second space extending between the second end surfaces of adjacent fluid treatment elements;

a surround positioned around each first space at the outer rims of the adjacent fluid treatment elements to fluidly isolate an outer end of each first space;

a plurality of posts positioned in a first space or a second space, each post extending along windings including the first, second, and third windings of at least one of the adjacent fluid treatment elements; and a fluid flow path extending between the first and second end surfaces of each fluid treatment element generally edgewise through the permeable fluid treatment medium.

8. The fluid treatment arrangement of claim 7 wherein each post extends along and is bonded to windings of at least one of the fluid treatment elements adjacent to the space.

9. A fluid treatment assembly comprising a housing and a fluid treatment arrangement of claim 7 disposed in the housing, wherein the housing has first and second ports and defines a fluid flow path between the first and second ports, the fluid treatment arrangement being positioned in the housing across the fluid flow path.

10. A method for making a fluid treatment arrangement comprising:

positioning first and second disk-shaped fluid treatment elements along a hollow core assembly, each including a spirally wound ribbon of permeable fluid treatment medium forming a plurality of windings including a first winding having first and second opposite major surfaces, a second winding adjacent to the first major surface of the first wind in and a third winding adjacent to the second major surface of the first winding, the first and second disk-shaped fluid treatment elements being axially separated from one another to define a space between the end surfaces of the first and second fluid treatment elements;

positioning each of a plurality of posts in the space along windings including the first, second, and third windings of an end surface of at least one of the first and second fluid treatment elements, and arranging each fluid treatment element in a fluid flow path extending between the end surfaces edgewise through the permeable fluid treatment medium.

11. The method of claim 10 wherein positioning the plurality of posts includes bonding each post to the plurality of windings.

12. The method of claim 10 wherein positioning the plurality of posts includes applying a liquid settable bonding material along the plurality of windings and solidifying the settable bonding material to form each post.

13. A fluid treatment element comprising a ribbon which includes a permeable fluid treatment medium and is spirally wound in a plurality of windings to form a disk-shaped body having a first axially facing end surface on one side of the body, a second axially facing surface on the opposite side of the body, and an outer rim, wherein the plurality of windings includes a first winding having first and second opposite major surfaces, a second winding adjacent to the first major surface of the first winding, and a third winding adjacent to the second major surface of the first winding and wherein the fluid treatment element further comprises a plurality of posts, each post extending along and bonded to windings including the first, second, third windings of at least one end surface of the disk-shaped body, and a fluid pathway which extends between the first and second end surfaces generally edgewise through the permeable fluid treatment medium and past the posts.

14. A method of making a fluid treatment element comprising spirally winding a permeable fluid treatment medium in a plurality of windings and forming a generally disk-shaped body having opposite end surfaces and an outer rim, wherein the plurality of windings includes a first winding having first and second opposite major surfaces, a second winding adjacent to the first major surface of the first winding, and a third winding adjacent to the second major surface of the first winding and bonding each of a plurality of posts to windings including the first, second, and third windings of at least one of the end surfaces of the disk-shaped body, and arranging the fluid treatment element in a fluid flow path extending between the opposite end surfaces edgewise through the windings of the permeable fluid treatment medium.

15. The method of claim 14 wherein bonding the plurality of posts includes applying a liquid settable bonding material to the end surface and solidifying the settable bonding material to form a post.

16. A method of treating a fluid comprising:
    directing a fluid between the exterior of a fluid treatment arrangement and the interior of a core assembly, including passing the fluid into one end surface of a disk-shaped body of a spirally wound strip of permeable fluid treatment medium forming a plurality of windings including a first winding having first and second opposite major surfaces, a second winding adjacent to the first major surface of the first winding, and a third winding adjacent to the second major surface of the first winding, treating the fluid by passing the fluid generally edgewise through windings of the permeable fluid treatment medium, and passing the fluid out of an opposite end surface of the disk-shaped body into a space adjacent to the spirally wound strip and past posts in the space that are each bonded to the windings, including the first, second, and third windings.

17. The fluid treatment arrangement of claim 1 further comprising a band which encircles and seals an outer end of the space.

18. The fluid treatment arrangement of claim 7 wherein the surround comprises a plurality of bands and each band encircles and seals an outer end of a first space.

19. The method of claim 10 further comprising positioning a band around an outer end of the space, including sealing the outer end of the space.

20. The method of claim 19 wherein positioning the band includes applying a liquid settable bonding material around the outer end of the space in contact with the first and second fluid treatment elements and solidifying the settable bonding material to seal the outer end of the space.

* * * * *